US012406403B2

(12) United States Patent
Xu et al.

(10) Patent No.: US 12,406,403 B2
(45) Date of Patent: Sep. 2, 2025

(54) VERTEX PREDICTION BASED ON MESH TRIANGULATION DERIVATION

(71) Applicant: TENCENT AMERICA LLC, Palo Alto, CA (US)

(72) Inventors: Xiaozhong Xu, State College, PA (US); Xiang Zhang, Sunnyvale, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 201 days.

(21) Appl. No.: 18/191,730

(22) Filed: Mar. 28, 2023

(65) Prior Publication Data
US 2023/0342983 A1    Oct. 26, 2023

Related U.S. Application Data

(60) Provisional application No. 63/333,976, filed on Apr. 22, 2022.

(51) Int. Cl.
*G06T 9/00*    (2006.01)

(52) U.S. Cl.
CPC .................................. *G06T 9/001* (2013.01)

(58) Field of Classification Search
CPC ......... G06T 9/001; G06T 17/00; G06T 17/20; G06T 19/00
See application file for complete search history.

(56) References Cited

U.S. PATENT DOCUMENTS

| 2020/0286261 | A1* | 9/2020 | Faramarzi ............... G06T 9/001 |
| 2021/0090301 | A1 | 3/2021 | Mammou et al. |
| 2021/0217203 | A1 | 7/2021 | Kim et al. |
| 2022/0108483 | A1 | 4/2022 | Graziosi et al. |
| 2023/0030913 | A1* | 2/2023 | Mammou ............ H04N 19/597 |
| 2023/0068178 | A1* | 3/2023 | Schwarz ............... H04N 13/388 |
| 2023/0171431 | A1* | 6/2023 | Oh ......................... H04N 19/30 |
| | | | 375/240.12 |
| 2023/0247222 | A1* | 8/2023 | Boyce .................. G06V 10/764 |
| | | | 375/240.12 |

OTHER PUBLICATIONS

International Search Report dated Jul. 21, 2023 in Application No. PCT/US23/16837.
Written Opinion dated Jul. 21, 2023 in Application No. PCT/US23/16837.
Communication dated Jun. 28, 2025 issued by Korean Patent Office in Application No. 10-2024-7022735.

* cited by examiner

*Primary Examiner* — Kee M Tung
*Assistant Examiner* — Xiaoming Wei
(74) *Attorney, Agent, or Firm* — Sughrue Mion, PLLC

(57) ABSTRACT

There is includes a method and apparatus comprising computer code configured to cause a processor or processors to perform obtaining volumetric data of at least one three-dimensional (3D) visual content, obtaining a plurality of 3D meshes from the volumetric data, projecting vertices of the plurality of 3D meshes onto a plurality of two-dimensional (2D) meshes, signaling connectivity information of the plurality of 3D meshes based on the plurality of 2D meshes, wherein the signaling the connectivity information comprises signaling whether ones of pixels of a 2D occupancy map is to be inferred or explicitly signaled.

18 Claims, 26 Drawing Sheets

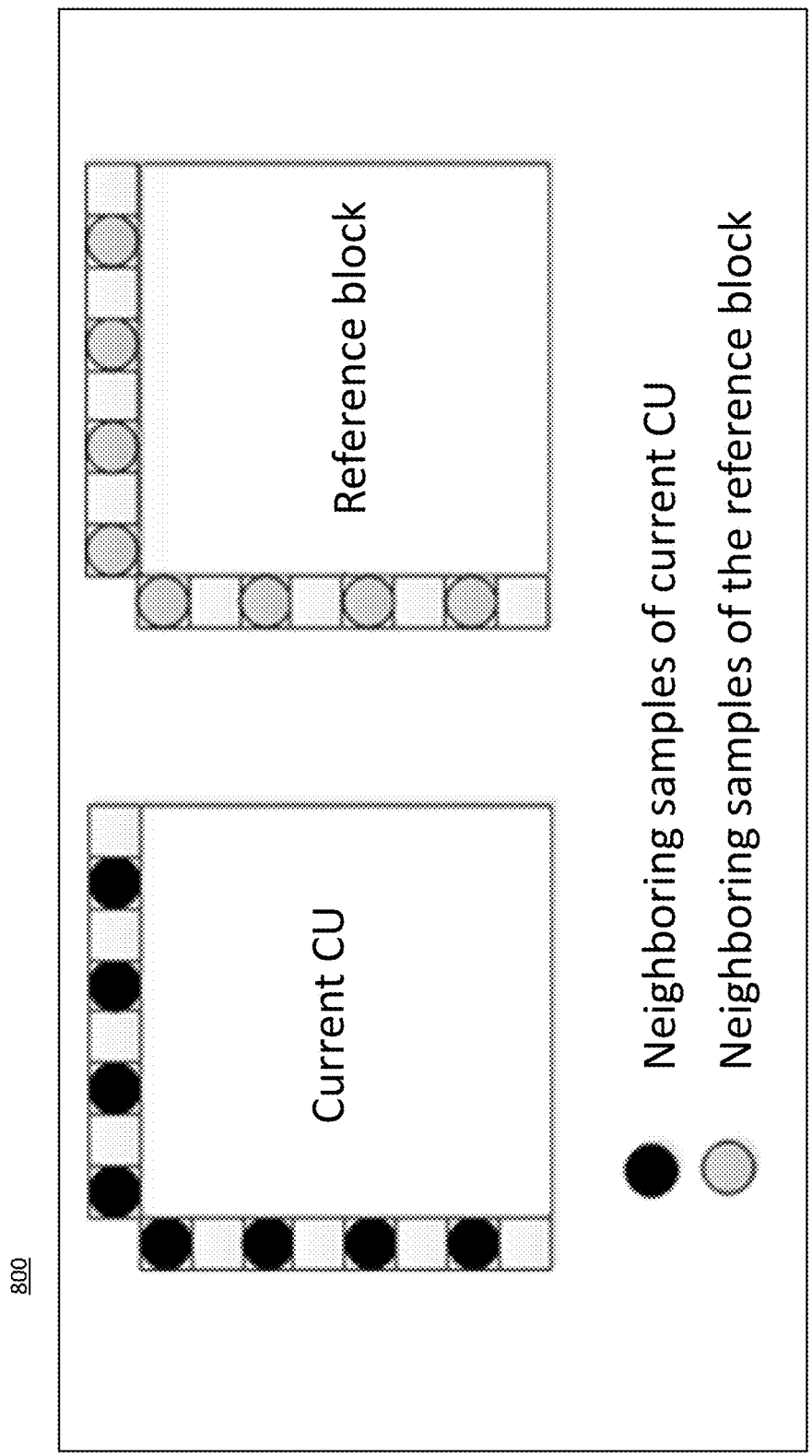

2500

VERTEX PREDICTION BASED ON MESH TRIANGULATION DERIVATION

CROSS REFERENCE TO RELATED APPLICATION

The present application claims priority to provisional applications U.S. 63/333,976 filed on Apr. 22, 2022 which is hereby expressly incorporated by reference, in its entirety, into the present application.

BACKGROUND

1. Field

The present disclosure is directed a set of advanced video coding technologies including mesh vertex prediction based on derived mesh triangulation for dynamic mesh compression.

2. Description of Related Art

The advances in 3D capture, modeling, and rendering have promoted the ubiquitous presence of 3D contents across several platforms and devices. Nowadays, it is possible to capture a baby's first step in one continent and allow the grandparents to see (and maybe interact) and enjoy a full immersive experience with the child in another continent. Nevertheless, in order to achieve such realism, models are becoming ever more sophisticated, and a significant amount of data is linked to the creation and consumption of those models.

Therefore, there is a desire for a technical solution to such problems.

SUMMARY

There is included a method and apparatus comprising memory configured to store computer program code and a processor or processors configured to access the computer program code and operate as instructed by the computer program code. The computer program is configured to cause the processor implement acquiring code configured to cause the at least one processor to obtain volumetric data of at least one three-dimensional (3D) visual content, obtaining code configured to cause the at least one processor to obtain a plurality of 3D meshes from the volumetric data, projecting code configured to cause the at least one processor to project vertices of the plurality of 3D meshes onto a plurality of two-dimensional (2D) meshes, and signaling code configured to cause the at least one processor to signal connectivity information of the plurality of 3D meshes based on the plurality of 2D meshes, wherein the signaling the connectivity information comprises signaling whether ones of pixels of a 2D occupancy map is to be inferred or explicitly signaled.

According to exemplary embodiments, the signaling the connectivity information further comprises signaling that: a first pixel of the pixels of the 2D occupancy map is to be inferred, and a second pixel of the pixels of the 2D occupancy map is to be explicitly signaled.

According to exemplary embodiments, the signaling the connectivity information further comprises setting a group of at least three pixels neighboring each other among other ones of the pixels of the 2D occupancy map, determining whether each of the at least three pixels is occupied or unoccupied according to the vertices of the plurality of 3D meshes projected onto the 2D meshes, and signaling, in response to determining that each of the at least three pixels is occupied, a first triangle mesh comprising the at least three pixels as vertices of the first triangle mesh.

According to exemplary embodiments, the signaling, in response to determining that each of the at least three pixels is occupied, the first triangle mesh comprises signaling that each of the at least three pixels is to be inferred.

According to exemplary embodiments, the group comprises four pixels, including the at least three pixels, neighboring each other among other ones of the pixels of the 2D occupancy map, and determining whether each of the at least three pixels is occupied or unoccupied comprises determining whether any of the four pixels is occupied or unoccupied according to the vertices of the plurality of 3D meshes projected onto the 2D meshes.

According to exemplary embodiments, signaling the connectivity information further comprises signaling, in response to determining that each of the four pixels is occupied, a quad mesh comprising the first triangle mesh and a second triangle mesh comprising vertices of a fourth pixel of the four pixels and at least two of the at least three pixels.

According to exemplary embodiments, the signaling, in response to determining that each of the four pixels is occupied, the quad mesh comprises signaling that each of the four pixels is to be inferred.

According to exemplary embodiments, the signaling the connectivity information further comprises signaling whether the 2D occupancy map comprises polygonal meshes of the pixels to be inferred.

According to exemplary embodiments, the polygonal meshes comprise a combination of triangle meshes and quad meshes.

According to exemplary embodiments, the signaling the connectivity information further comprises signaling, in at least one of a sequence header and a slice header, whether the 2D occupancy map comprises the polygonal meshes of the pixels to be inferred.

BRIEF DESCRIPTION OF THE DRAWINGS

Further features, nature, and various advantages of the disclosed subject matter will be more apparent from the following detailed description and the accompanying drawings in which:

FIG. 8 is a simplified diagram in accordance with embodiments.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
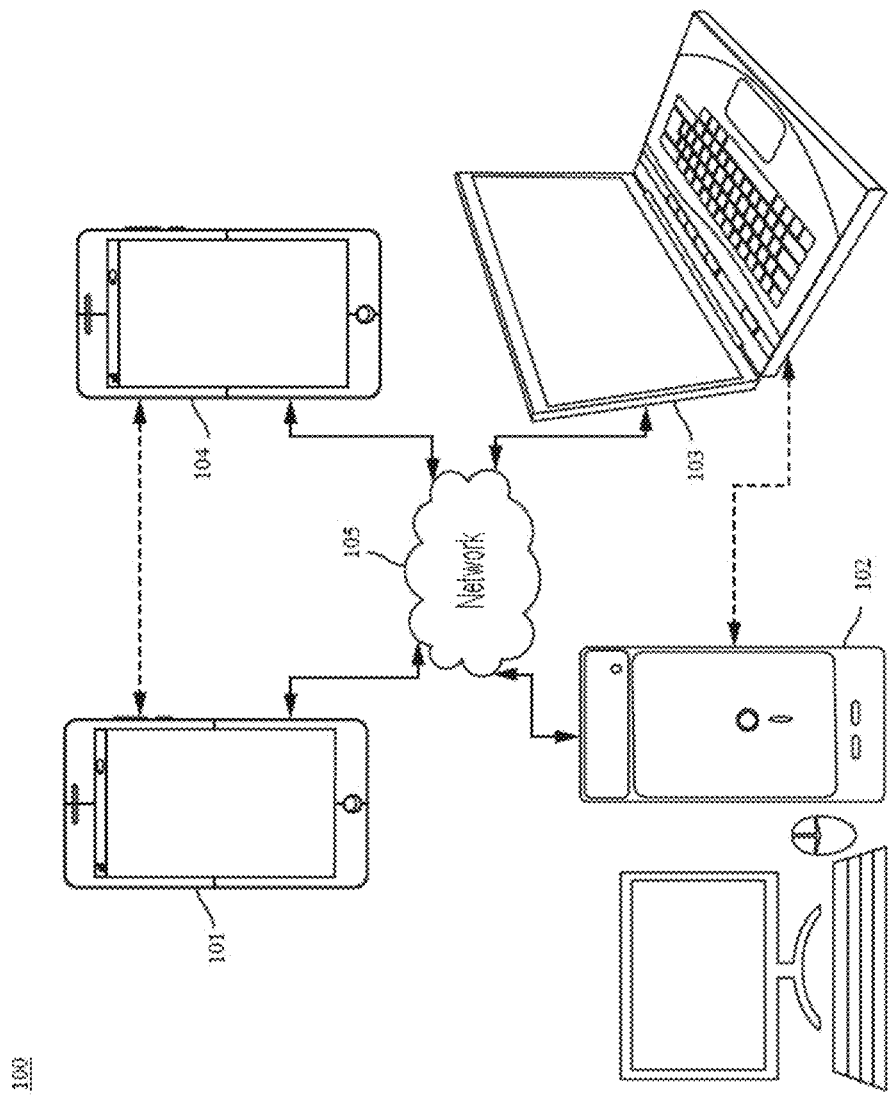
FIG. 1 is a schematic illustrations of a diagram in accordance with embodiments.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
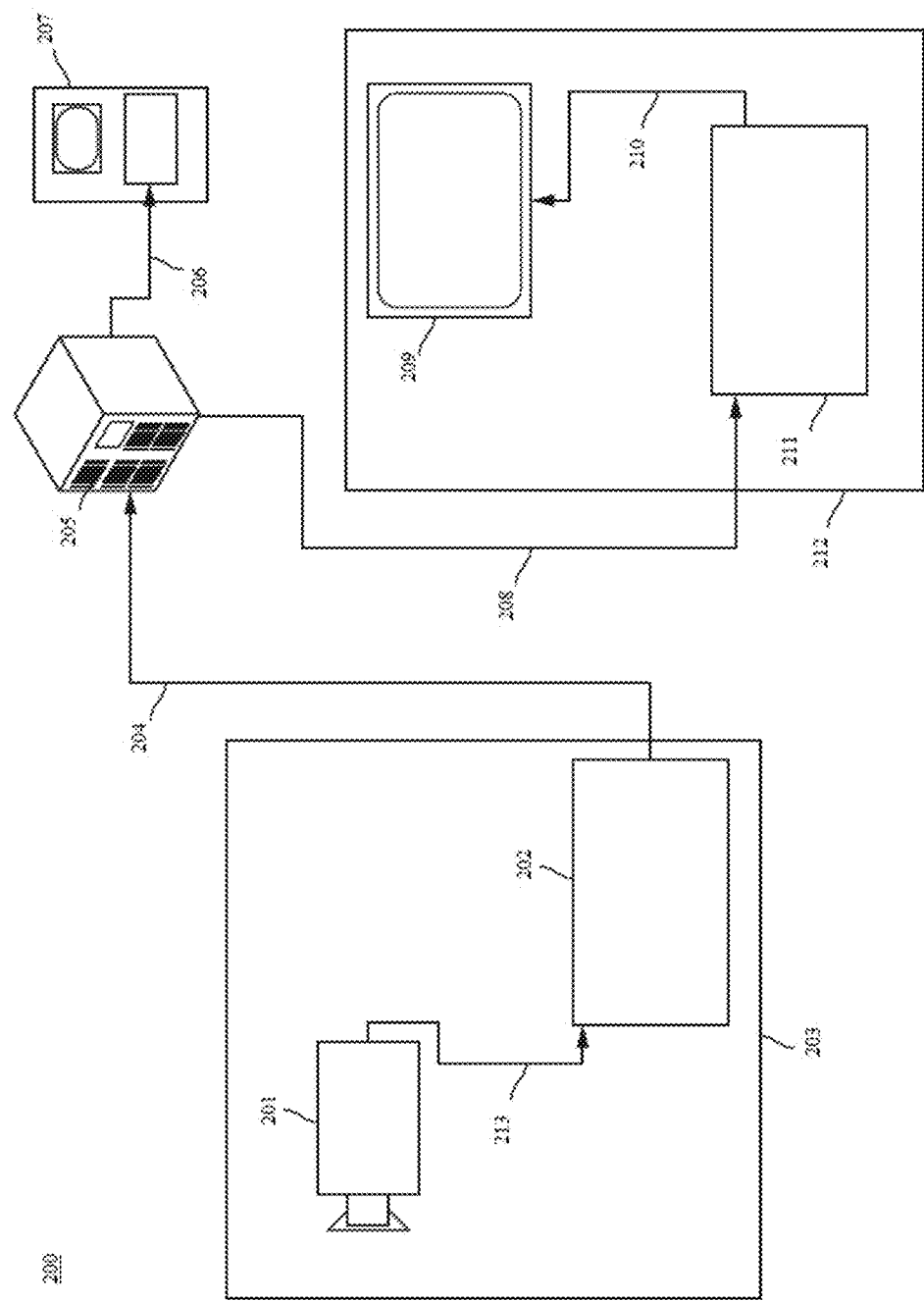
FIG. 2 is a simplified block diagram in accordance with embodiments.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213 may be emphasized as a high data volume when compared to encoded video bitstreams and can be processed by an encoder 202 coupled to the camera 201. The encoder 202 can include hardware, software, or a combination thereof to enable or implement aspects of the disclosed subject matter as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device (not depicted). In some streaming systems, the video bitstreams 204, 206 and 208 can be encoded according to certain video coding/compression standards. Examples of those standards are noted above and described further herein.

Figure 3:
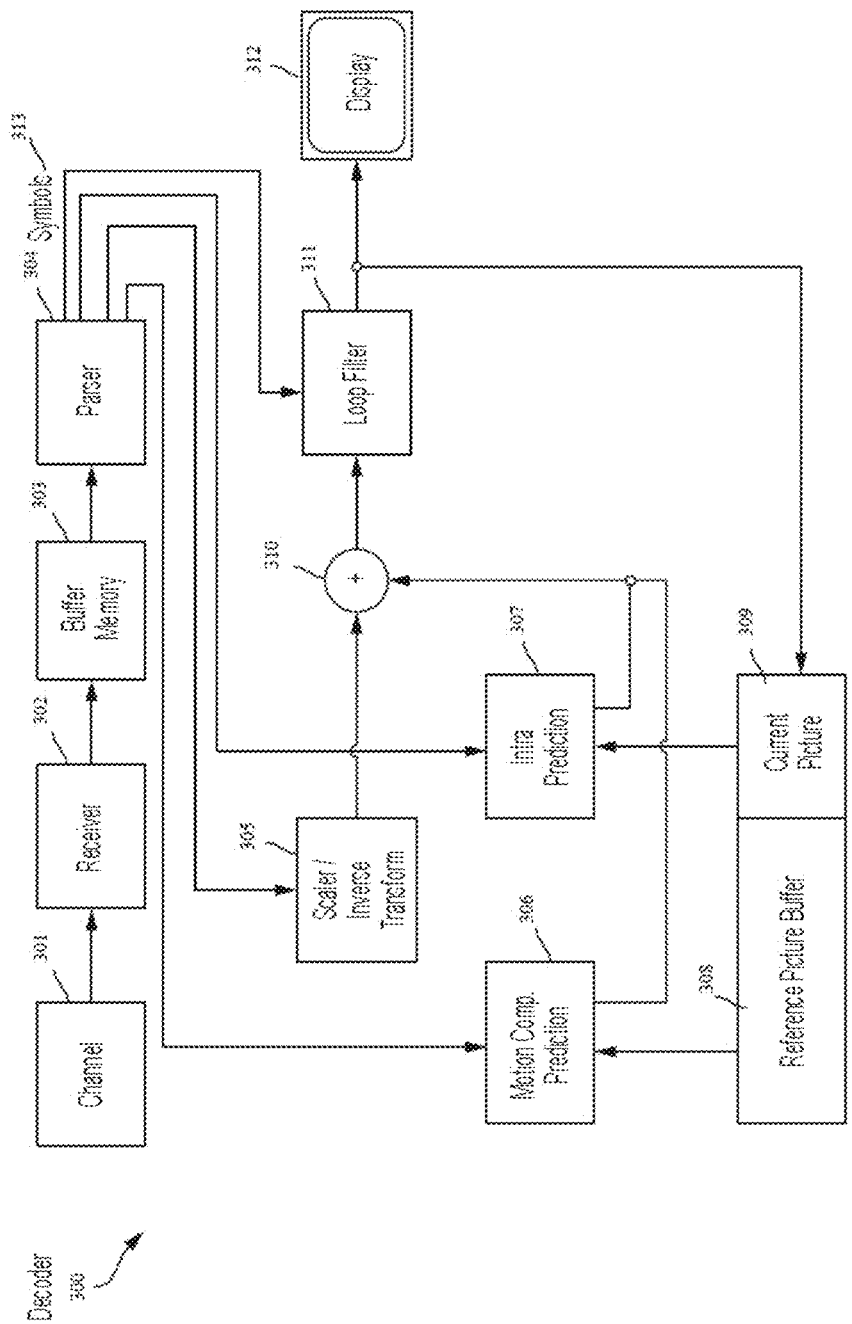
FIG. 3 is a simplified block diagram in accordance with embodiments.

FIG. 3 may be a functional block diagram of a video decoder 300 according to an embodiment of the present invention.

A receiver 302 may receive one or more codec video sequences to be decoded by the decoder 300; in the same or another embodiment, one coded video sequence at a time, where the decoding of each coded video sequence is independent from other coded video sequences. The coded video sequence may be received from a channel 301, which may be a hardware/software link to a storage device which stores the encoded video data. The receiver 302 may receive the encoded video data with other data, for example, coded audio data and/or ancillary data streams, that may be forwarded to their respective using entities (not depicted). The receiver 302 may separate the coded video sequence from the other data. To combat network jitter, a buffer memory 303 may be coupled in between receiver 302 and entropy decoder/parser 304 ("parser" henceforth). When receiver 302 is receiving data from a store/forward device of sufficient bandwidth and controllability, or from an isosynchronous network, the buffer 303 may not be needed, or can be small. For use on best effort packet networks such as the Internet, the buffer 303 may be required, can be comparatively large and can advantageously of adaptive size.

The video decoder 300 may include a parser 304 to reconstruct symbols 313 from the entropy coded video sequence. Categories of those symbols include information used to manage operation of the decoder 300, and potentially information to control a rendering device such as a display 312 that is not an integral part of the decoder but can be coupled to it. The control information for the rendering device(s) may be in the form of Supplementary Enhancement Information (SEI messages) or Video Usability Information (VUI) parameter set fragments (not depicted). The parser 304 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 304 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser 304 may perform entropy decoding/parsing operation on the video sequence received from the buffer 303, so to create symbols 313. The parser 304 may receive encoded data, and selectively decode particular symbols 313. Further, the parser 304 may determine whether the particular symbols 313 are to be provided to a Motion Compensation Prediction unit 306, a scaler/inverse transform unit 305, an Intra Prediction Unit 307, or a loop filter 311.

Reconstruction of the symbols 313 can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser 304. The flow of such subgroup control information between the parser 304 and the multiple units below is not depicted for clarity.

Beyond the functional blocks already mentioned, decoder 300 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit 305. The scaler/inverse transform unit 305 receives quantized transform coefficient as well as control information, including which transform to use, block size, quantization factor, quantization scaling matrices, etc. as symbol(s) 313 from the parser 304. It can output blocks comprising sample values, that can be input into aggregator 310.

In some cases, the output samples of the scaler/inverse transform 305 can pertain to an intra coded block; that is: a block that is not using predictive information from previously reconstructed pictures, but can use predictive information from previously reconstructed parts of the current picture. Such predictive information can be provided by an intra picture prediction unit 307. In some cases, the intra picture prediction unit 307 generates a block of the same size and shape of the block under reconstruction, using surrounding already reconstructed information fetched from the current (partly reconstructed) picture 309. The aggregator 310, in some cases, adds, on a per sample basis, the prediction information the intra prediction unit 307 has generated to the output sample information as provided by the scaler/inverse transform unit 305.

In other cases, the output samples of the scaler/inverse transform unit 305 can pertain to an inter coded, and potentially motion compensated block. In such a case, a Motion Compensation Prediction unit 306 can access reference picture memory 308 to fetch samples used for prediction. After motion compensating the fetched samples in accordance with the symbols 313 pertaining to the block, these samples can be added by the aggregator 310 to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols 313 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 310 can be subject to various loop filtering techniques in the loop filter unit 311. Video compression technologies can include in-loop filter technologies that are controlled by parameters included in the coded video bitstream and made available to the loop filter unit 311 as symbols 313 from the parser 304, but can also be responsive to meta-information obtained during the decoding of previous (in decoding order) parts of the coded picture or coded video sequence, as well as responsive to previously reconstructed and loop-filtered sample values.

The output of the loop filter unit 311 can be a sample stream that can be output to the render device 312 as well as stored in the reference picture memory 557 for use in future inter-picture prediction.

Certain coded pictures, once fully reconstructed, can be used as reference pictures for future prediction. Once a coded picture is fully reconstructed and the coded picture has been identified as a reference picture (by, for example, parser 304), the current reference picture 309 can become part of the reference picture buffer 308, and a fresh current picture memory can be reallocated before commencing the reconstruction of the following coded picture.

The video decoder 300 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 302 may receive additional (redundant) data with the encoded video. The additional data may be included as part of the coded video sequence(s). The additional data may be used by the video decoder 300 to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 4:
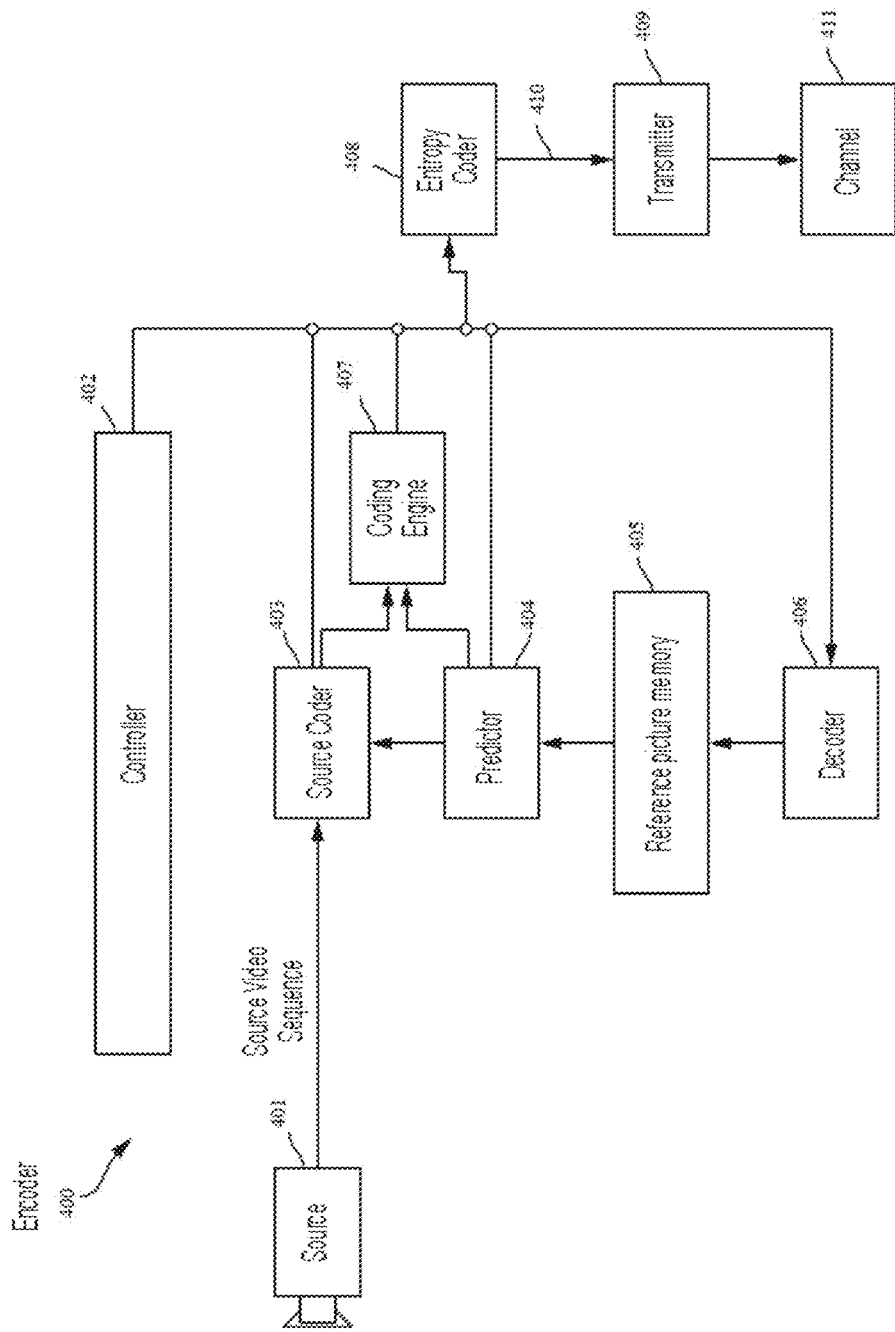
FIG. 4 is a simplified block diagram in accordance with embodiments.

FIG. 4 may be a functional block diagram of a video encoder 400 according to an embodiment of the present disclosure.

The encoder 400 may receive video samples from a video source 401 (that is not part of the encoder) that may capture video image(s) to be coded by the encoder 400.

The video source 401 may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source 401 may be a storage device storing previously prepared video. In a videoconferencing system, the video source 401 may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder 400 may code and compress the pictures of the source video sequence into a coded video sequence 410 in real time or under any other time constraints as required by the application. Enforcing appropriate coding speed is one function of Controller 402. Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 402 as they may pertain to video encoder 400 optimized for a certain system design.

Some video encoders operate in what a person skilled in the art readily recognizes as a "coding loop." As an oversimplified description, a coding loop can consist of the encoding part of an encoder 402 ("source coder" henceforth) (responsible for creating symbols based on an input picture to be coded, and a reference picture(s)), and a (local) decoder 406 embedded in the encoder 400 that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory 405. As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder 406 can be the same as of a "remote" decoder 300, which has already been described in detail above in conjunction with FIG. 3. Briefly referring also to FIG. 4, however, as symbols are available and en/decoding of symbols to a coded video sequence by entropy coder 408 and parser 304 can be lossless, the entropy decoding parts of decoder 300, including channel 301, receiver 302, buffer 303, and parser 304 may not be fully implemented in local decoder 406.

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder 403 may perform motion compensated predictive coding, which codes an input frame predictively with reference to one or more previously-coded frames from the video sequence that were designated as "reference frames." In this manner, the coding engine 407 codes differences between pixel blocks of an input frame and pixel blocks of reference frame(s) that may be selected as prediction reference(s) to the input frame.

The local video decoder 406 may decode coded video data of frames that may be designated as reference frames, based on symbols created by the source coder 403. Operations of the coding engine 407 may advantageously be lossy processes. When the coded video data may be decoded at a video decoder (not shown in FIG. 4), the reconstructed video sequence typically may be a replica of the source video sequence with some errors. The local video decoder 406 replicates decoding processes that may be performed by the video decoder on reference frames and may cause reconstructed reference frames to be stored in the reference picture cache 405. In this manner, the encoder 400 may store copies of reconstructed reference frames locally that have common content as the reconstructed reference frames that will be obtained by a far-end video decoder (absent transmission errors).

The predictor 404 may perform prediction searches for the coding engine 407. That is, for a new frame to be coded, the predictor 404 may search the reference picture memory 405 for sample data (as candidate reference pixel blocks) or certain metadata such as reference picture motion vectors, block shapes, and so on, that may serve as an appropriate prediction reference for the new pictures. The predictor 404 may operate on a sample block-by-pixel block basis to find appropriate prediction references. In some cases, as determined by search results obtained by the predictor 404, an input picture may have prediction references drawn from multiple reference pictures stored in the reference picture memory 405.

The controller 402 may manage coding operations of the video coder 403, including, for example, setting of parameters and subgroup parameters used for encoding the video data.

Output of all aforementioned functional units may be subjected to entropy coding in the entropy coder 408. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 409 may buffer the coded video sequence(s) as created by the entropy coder 408 to prepare it for transmission via a communication channel 411, which may be a hardware/software link to a storage device which would store the encoded video data. The transmitter 409 may merge coded video data from the video coder 403 with other data to be transmitted, for example, coded audio data and/or ancillary data streams (sources not shown).

The controller 402 may manage operation of the encoder 400. During coding, the controller 405 may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder 400 may perform coding operations according to a predetermined video coding technology or standard, such as ITU-T Rec. H.265. In its operation, the video coder 400 may perform various compression operations, including predictive coding operations that exploit temporal and spatial redundancies in the input video sequence. The coded video data, therefore, may conform to a syntax specified by the video coding technology or standard being used.

In an embodiment, the transmitter 409 may transmit additional data with the encoded video. The source coder 403 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Figure 5:
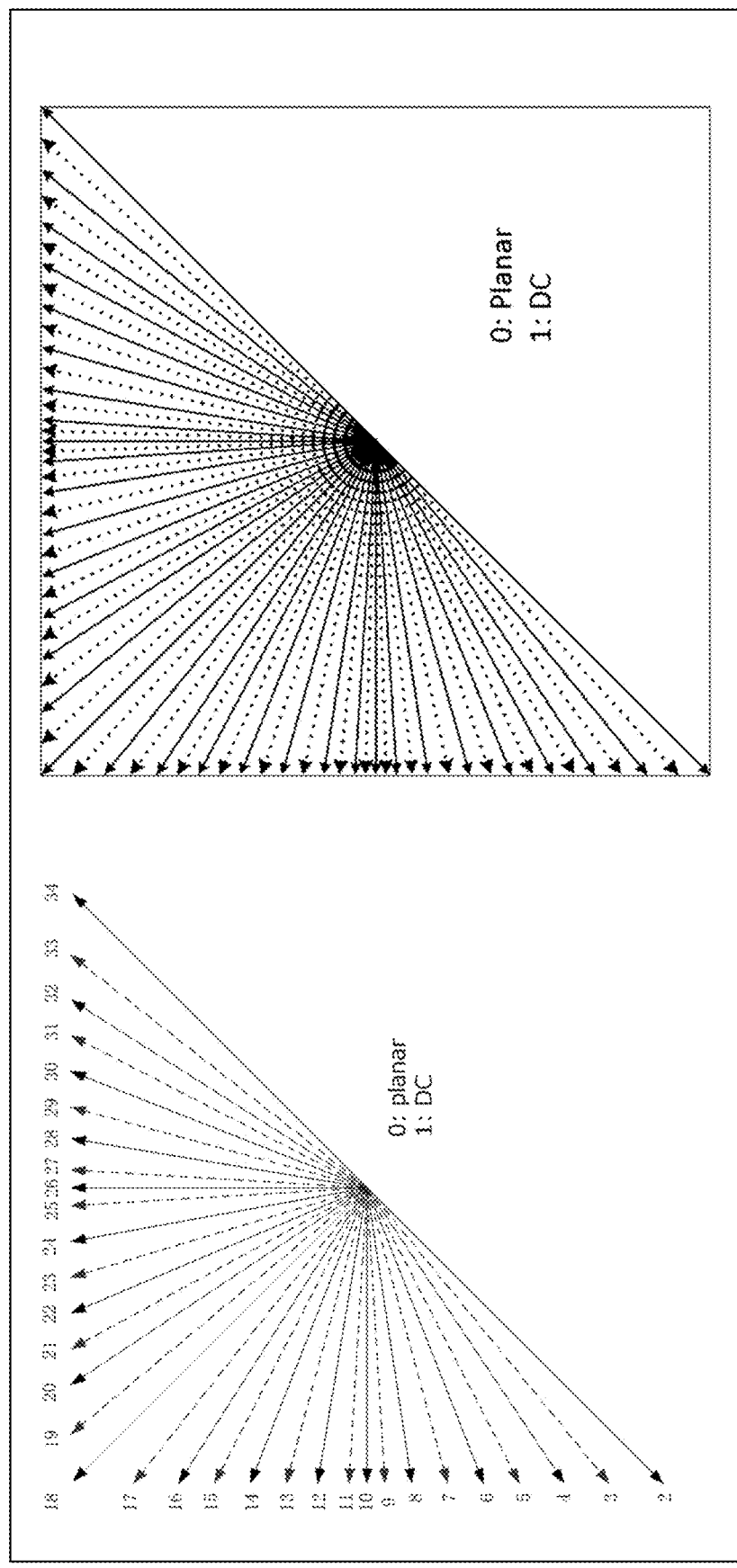
FIG. 5 is a simplified diagram in accordance with embodiments.

FIG. 5 illustrates intra prediction modes used in HEVC and JEM. To capture the arbitrary edge directions presented in natural video, the number of directional intra modes is extended from 33, as used in HEVC, to 65. The additional directional modes in JEM on top of HEVC are depicted as dotted arrows in FIG. 1 (*b*), and the planar and DC modes remain the same. These denser directional intra prediction modes apply for all block sizes and for both luma and chroma intra predictions. As shown in FIG. 5, the directional intra prediction modes as identified by dotted arrows, which is associated with an odd intra prediction mode index, are called odd intra prediction modes. The directional intra prediction modes as identified by solid arrows, which are associated with an even intra prediction mode index, are called even intra prediction modes. In this document, the directional intra prediction modes, as indicated by solid or dotted arrows in FIG. 5 are also referred as angular modes.

In JEM, a total of 67 intra prediction modes are used for luma intra prediction. To code an intra mode, an most probable mode (MPM) list of size 6 is built based on the intra modes of the neighboring blocks. If intra mode is not from the MPM list, a flag is signaled to indicate whether intra mode belongs to the selected modes. In JEM-3.0, there are 16 selected modes, which are chosen uniformly as every fourth angular mode. In JVET-D0114 and JVET-G0060, 16 secondary MPMs are derived to replace the uniformly selected modes.

Figure 6:
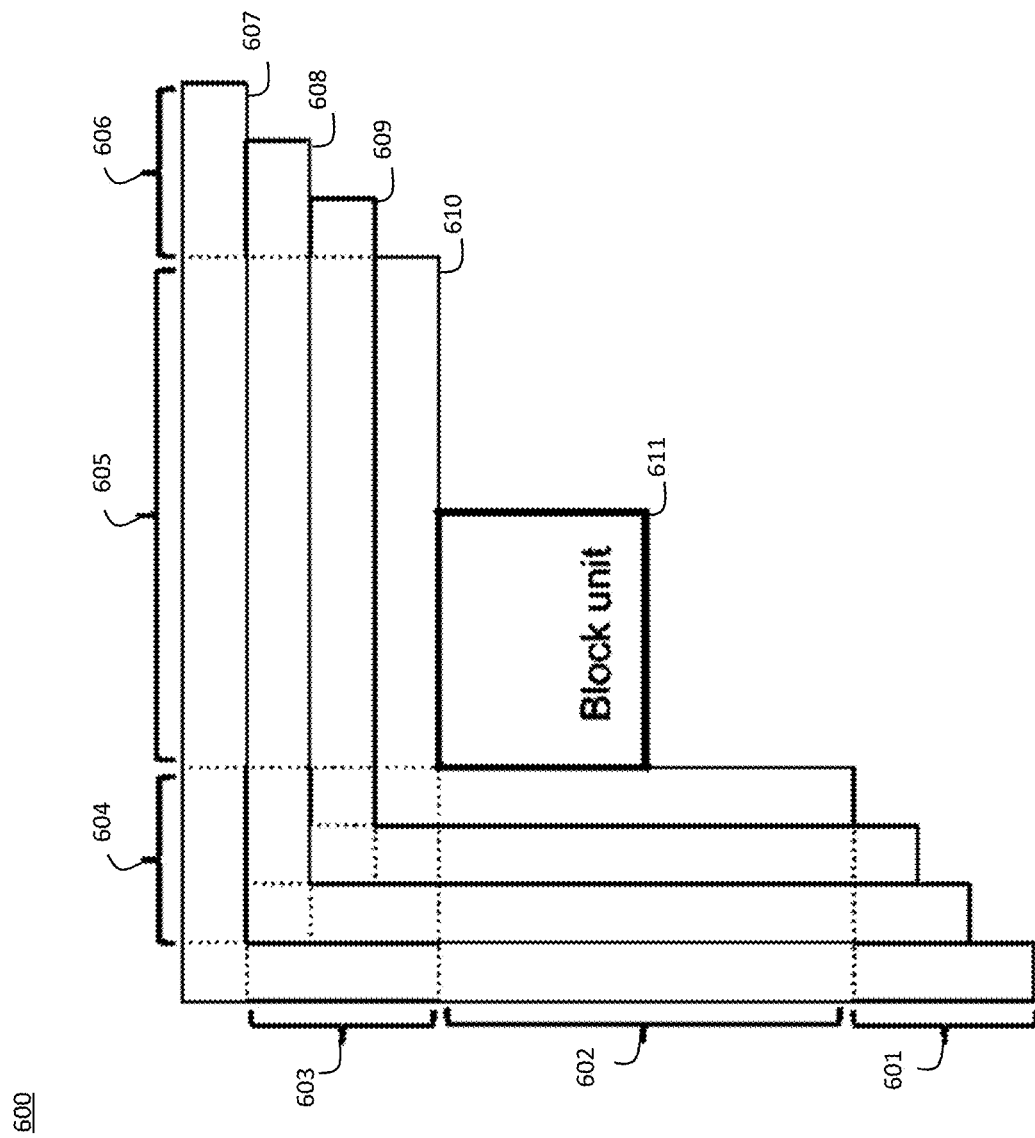
FIG. 6 is a simplified diagram in accordance with embodiments.

FIG. 6 illustrates N reference tiers exploited for intra directional modes. There is a block unit 611, a segment A 601, a segment B 602, a segment C 603, a segment D 604, a segment E 605, a segment F 606, a first reference tier 610, a second reference tier 609, a third reference tier 608 and a fourth reference tier 607.

In both HEVC and JEM, as well as some other standards such as H.264/AVC, the reference samples used for predicting the current block are restricted to a nearest reference line (row or column). In the method of multiple reference line intra prediction, the number of candidate reference lines (row or columns) are increased from one (i.e. the nearest) to N for the intra directional modes, where N is an integer greater than or equal to one. FIG. 2 takes 4×4 prediction unit (PU) as an example to show the concept of the multiple line intra directional prediction method. An intra-directional mode could arbitrarily choose one of N reference tiers to generate the predictors. In other words, the predictor p(x,y) is generated from one of the reference samples S1, S2, . . . , and SN. A flag is signaled to indicate which reference tier is chosen for an intra-directional mode. If N is set as 1, the intra directional prediction method is the same as the traditional method in JEM 2.0. In FIG. 6, the reference lines 610, 609, 608 and 607 are composed of six segments 601, 602, 603, 604, 605 and 606 together with the top-left reference sample. In this document, a reference tier is also called a reference line. The coordinate of the top-left pixel within current block unit is (0,0) and the top left pixel in the 1st reference line is (−1,−1).

In JEM, for the luma component, the neighboring samples used for intra prediction sample generations are filtered before the generation process. The filtering is controlled by the given intra prediction mode and transform block size. If the intra prediction mode is DC or the transform block size is equal to 4×4, neighboring samples are not filtered. If the distance between the given intra prediction mode and vertical mode (or horizontal mode) is larger than predefined threshold, the filtering process is enabled. For neighboring sample filtering, [1, 2, 1] filter and bi-linear filters are used.

A position dependent intra prediction combination (PDPC) method is an intra prediction method which invokes a combination of the un-filtered boundary reference samples and HEVC style intra prediction with filtered boundary reference samples. Each prediction sample pred[x][y] located at (x, y) is calculated as follows:

$$\text{pred}[x][y]=(wL*R_{-1,y}+wT*R_{x,-1}+wTL*R_{-1,-1}+(64-wL-wT-wTL)*\text{pred}[x][y]+32)>>6 \quad \text{(Eq. 2-1)}$$

where $R_{x,-1}$, $R_{-1,y}$ represent the unfiltered reference samples located at top and left of current sample (x, y), respectively, and $R_{-1,-1}$ represents the unfiltered reference sample located at the top-left corner of the current block. The weightings are calculated as below, $$wT=32>>((y<<1)>>\text{shift}) \quad \text{(Eq. 2-2)}$$

$$wL=32>>((x<<1)>>\text{shift}) \quad \text{(Eq. 2-3)}$$

$$wTL=-(wL>>4)-(wT>>4) \quad \text{(Eq. 2-4)}$$

$$\text{shift}=(\log 2(\text{width})+\log 2(\text{height})+2)>>2 \quad \text{(Eq. 2-5)}.$$

Figure 7:
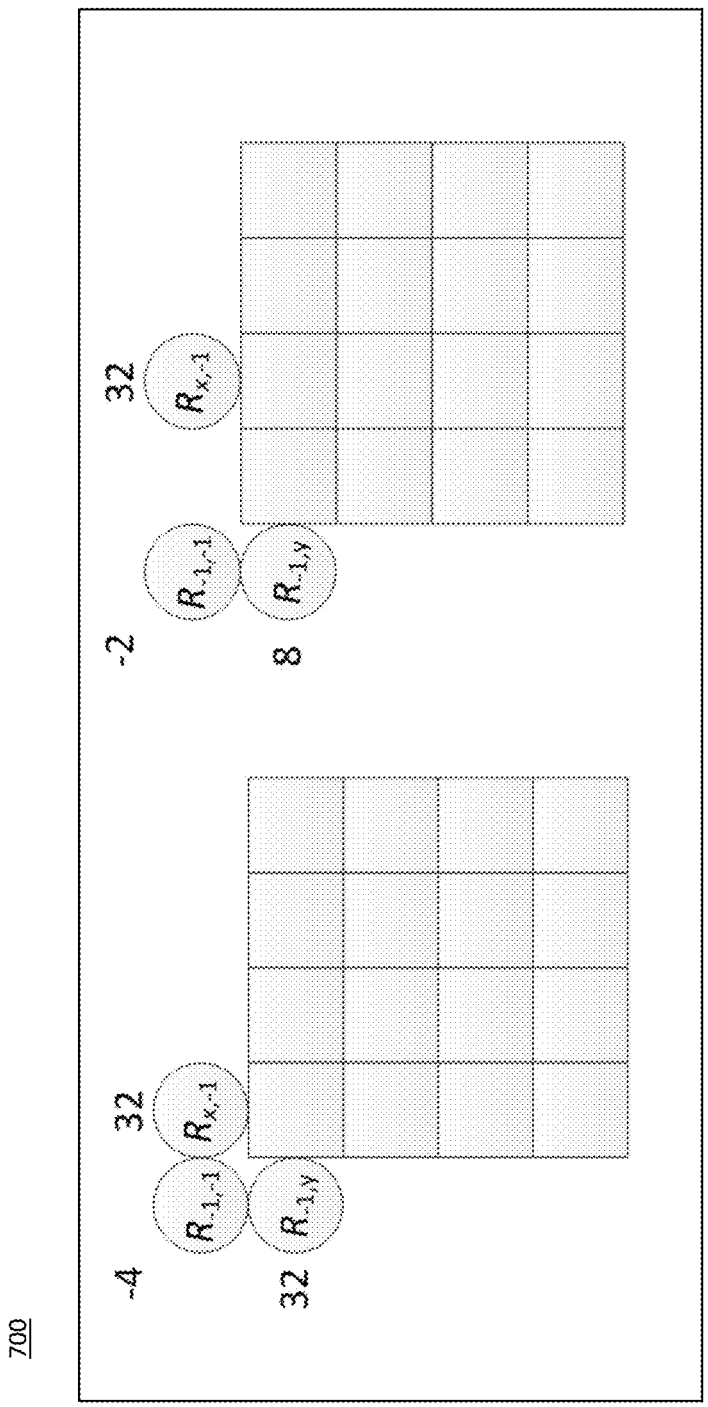
FIG. 7 is a simplified diagram in accordance with embodiments.

FIG. 7 illustrates a diagram 700 in which DC mode PDPC weights (wL, wT, wTL) for (0, 0) and (1, 0) positions inside one 4×4 block. If PDPC is applied to DC, planar, horizontal, and vertical intra modes, additional boundary filters are not needed, such as the HEVC DC mode boundary filter or horizontal/vertical mode edge filters. FIG. 7 illustrates the definition of reference samples Rx,−1, R−1,y and R−1,−1 for PDPC applied to the top-right diagonal mode. The prediction sample pred(x', y') is located at (x', y') within the prediction block. The coordinate x of the reference sample Rx,−1 is given by: x=x'+y'+1, and the coordinate y of the reference sample R−1,y is similarly given by: y=x'+y'+1.

FIG. 8 illustrates a Local Illumination Compensation (LIC) diagram 800 and is based on a linear model for illumination changes, using a scaling factor a and an offset b. And it is enabled or disabled adaptively for each inter-mode coded coding unit (CU).

When LIC applies for a CU, a least square error method is employed to derive the parameters a and b by using the neighboring samples of the current CU and their corresponding reference samples. More specifically, as illustrated in FIG. 8, the subsampled (2:1 subsampling) neighboring samples of the CU and the corresponding samples (identified by motion information of the current CU or sub-CU) in the reference picture are used. The IC parameters are derived and applied for each prediction direction separately.

When a CU is coded with merge mode, the LIC flag is copied from neighboring blocks, in a way similar to motion information copy in merge mode; otherwise, an LIC flag is signaled for the CU to indicate whether LIC applies or not.

Figure 9B:
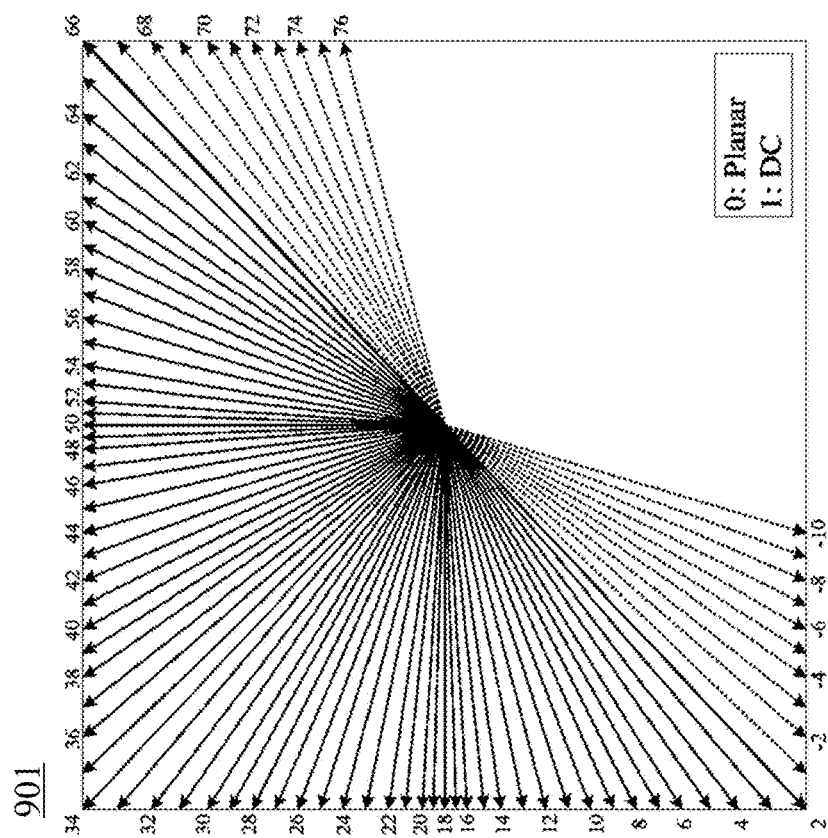
FIGS. 9A and 9B are simplified diagrams in accordance with embodiments.
Figure 9A:
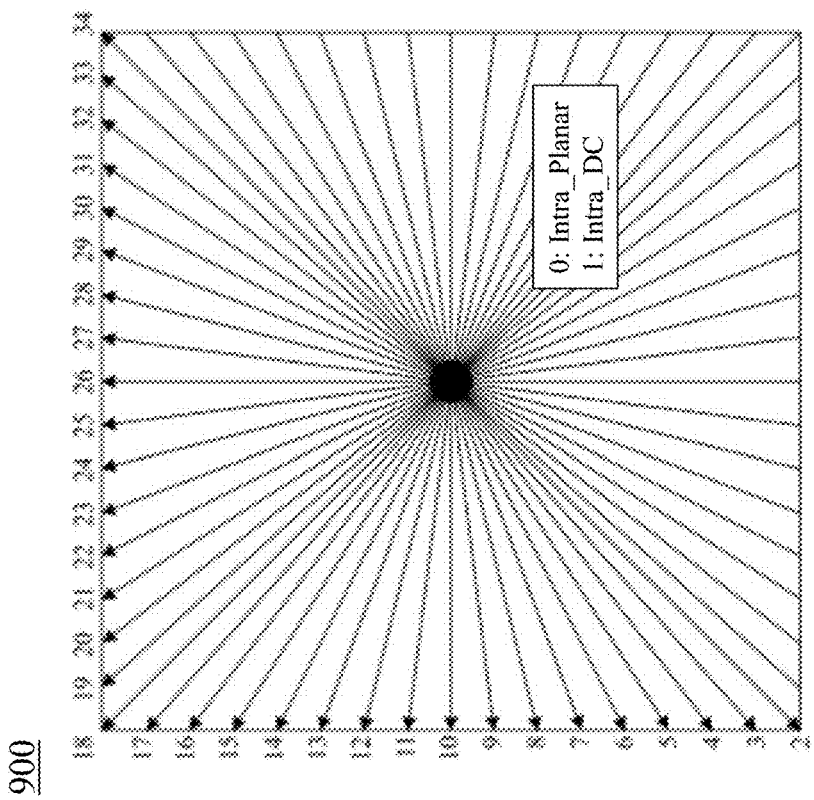

FIG. 9A illustrates intra prediction modes 900 used in HEVC. In HEVC, there are total 35 intra prediction modes, among which mode 10 is horizontal mode, mode 26 is vertical mode, and mode 2, mode 18 and mode 34 are diagonal modes. The intra prediction modes are signaled by three most probable modes (MPMs) and 32 remaining modes.

FIG. 9B illustrates, in embodiments of VVC, there are total 87 intra prediction modes where mode 18 is horizontal mode, mode 50 is vertical mode, and mode 2, mode 34 and mode 66 are diagonal modes. Modes −1~−10 and Modes 67~76 are called Wide-Angle Intra Prediction (WAIP) modes.

The prediction sample pred(x,y) located at position (x, y) is predicted using an intra prediction mode (DC, planar, angular) and a linear combination of reference samples according to the PDPC expression:

$$\text{pred}(x,y)=(wL\times R_{-1,y}+wT\times R_{x,-1}-wTL\times R_{-1,-1}+(64-wL-wT+wTL)\times \text{pred}(x,y)+32)>>6$$

where Rx,−1, R−1,y represent the reference samples located at the top and left of current sample (x, y), respectively, and R−1,−1 represents the reference sample located at the top-left corner of the current block.

For the DC mode the weights are calculated as follows for a block with dimensions width and height:

$$wT=32>>((y<<1)>>n\text{Scale}), wL=32>>((x<<1)>>n\text{Scale}), wTL=(wL>>4)+(wT>>4),$$

with nScale=(log 2(width)−2+log 2(height)−2+2)>>2, where wT denotes the weighting factor for the reference sample located in the above reference line with the same horizontal coordinate, wL denotes the weighting factor for the reference sample located in the left reference line with the same vertical coordinate, and wTL denotes the weighting factor for the top-left reference sample of the current block, nScale specifies how fast weighting factors decrease along the axis (wL decreasing from left to right or wT decreasing from top to bottom), namely weighting factor decrement rate, and it is the same along x-axis (from left to right) and y-axis (from top to bottom) in current design. And 32 denotes the initial weighting factors for the neighboring samples, and the initial weighting factor is also the top (left or top-left) weightings assigned to top-left sample in current CB, and the weighting factors of neighboring samples in PDPC process should be equal to or less than this initial weighting factor.

For planar mode wTL=0, while for horizontal mode wTL=wT and for vertical mode wTL=wL. The PDPC weights can be calculated with adds and shifts only. The value of pred(x,y) can be computed in a single step using Eq. 1.

Figure 10:
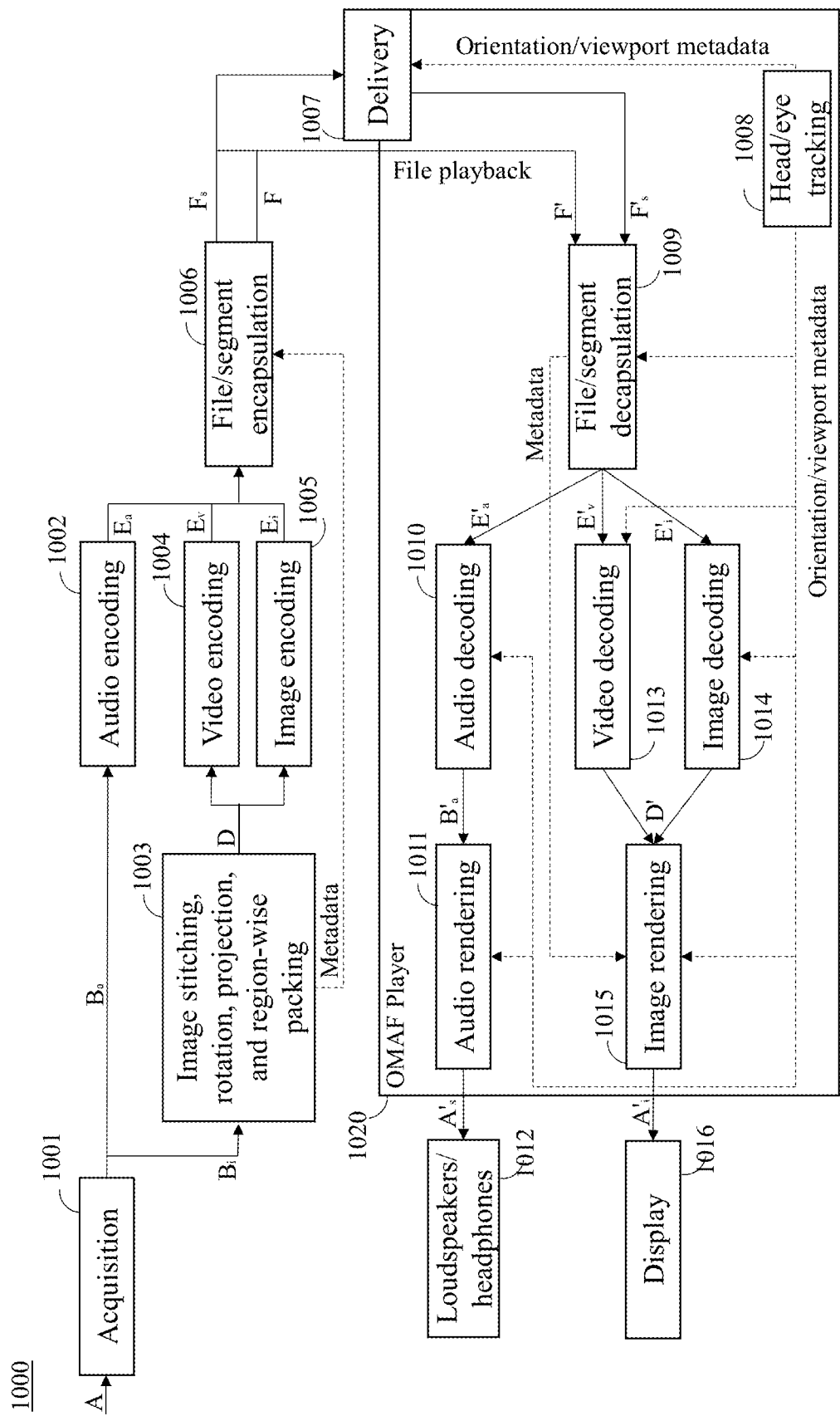
FIGS. 10 and 11 are simplified block diagrams in accordance with embodiments.

FIG. 10 illustrates a simplified block-style workflow diagram 1000 of exemplary view-port dependent processing an in Omnidirectional Media Application Format (OMAF) that may allow for 360-degree virtual reality (VR360) streaming described in OMAF.

At acquisition block 1001, video data A is acquired, such as data of multiple images and audio of same time instances in a case that the image data may represent scenes in VR360. At processing block 1003, the images $B_i$ of the same time instance are processed by one or more of being stitched, mapped onto a projected picture with respect to one or more virtual reality (VR) angles or other angles/viewpoint(s) and region-wise packed. Additionally, metadata may be created indicating any of such processed information and other information so as to assist in delivering and rendering processes.

With respect to data D, at image encoding block 1005, the projected pictures are encoded to data $E_i$ and composed into a media file, and in viewport-independent streaming, and at video encoding block 1004, the video pictures are encoded as data $E_v$ as a single-layer bitstream, for example, and with respect to data Ba the audio data may also be encoded into data $E_a$ at audio encoding block 1002.

The data $E_a$, $E_v$, and $E_i$, the entire coded bitstream $F_i$ and/or F may be stored at a (content delivery network (CDN)/cloud) server, and typically may be fully transmitted, such as at delivery block 1007 or otherwise, to an OMAF player 1020 and may be fully decoded by a decoder such that at least an area of a decoded picture corresponding to a current viewport is rendered to the user at display block 1016 with respect to the various metadata, file playback, and orientation/viewport metadata, such as an angle at which a user may be looking through a VR image device with respect to viewport specifications of that device, from the head/eye tracking block 1008. A distinct feature of VR360 is that only a viewport may be displayed at any particular time, and such feature may be utilized to improve the performance of omnidirectional video systems, through selective delivery depending on the user's viewport (or any other criteria, such as recommended viewport timed metadata). For example, viewport-dependent delivery may be enabled by tile-based video coding according to exemplary embodiments.

As with the encoding blocks described above, the OMAF player 1020 according to exemplary embodiments may similarly reverse one or more facets of such encoding with respect to the file/segment decapsulation of one or more of the data F' and/or F'$_i$ and metadata, decode the audio data E'$_i$ at audio decoding block 1010, the video data E'$_v$ at video decoding block 1013, and the image data E'$_i$ at image decoding block 1014 to proceed with audio rendering of the data B'$_a$ at audio rendering block 1011 and image rendering of the data D' at image rendering block 1015 so as to output, in a VR360 format according to various metadata such as the orientation/viewport metadata, display data A', at display block 1016 and audio data A's at the loudspeakers/headphones block 1012. The various metadata may influence ones of the data decoding and rendering processes depending on various tracks, languages, qualities, views, that may be selected by or for a user of the OMAF player 1020, and it is to be understood that the order of processing described herein is presented for exemplary embodiments and may be implemented in other orders according to other exemplary embodiments.

Figure 11:
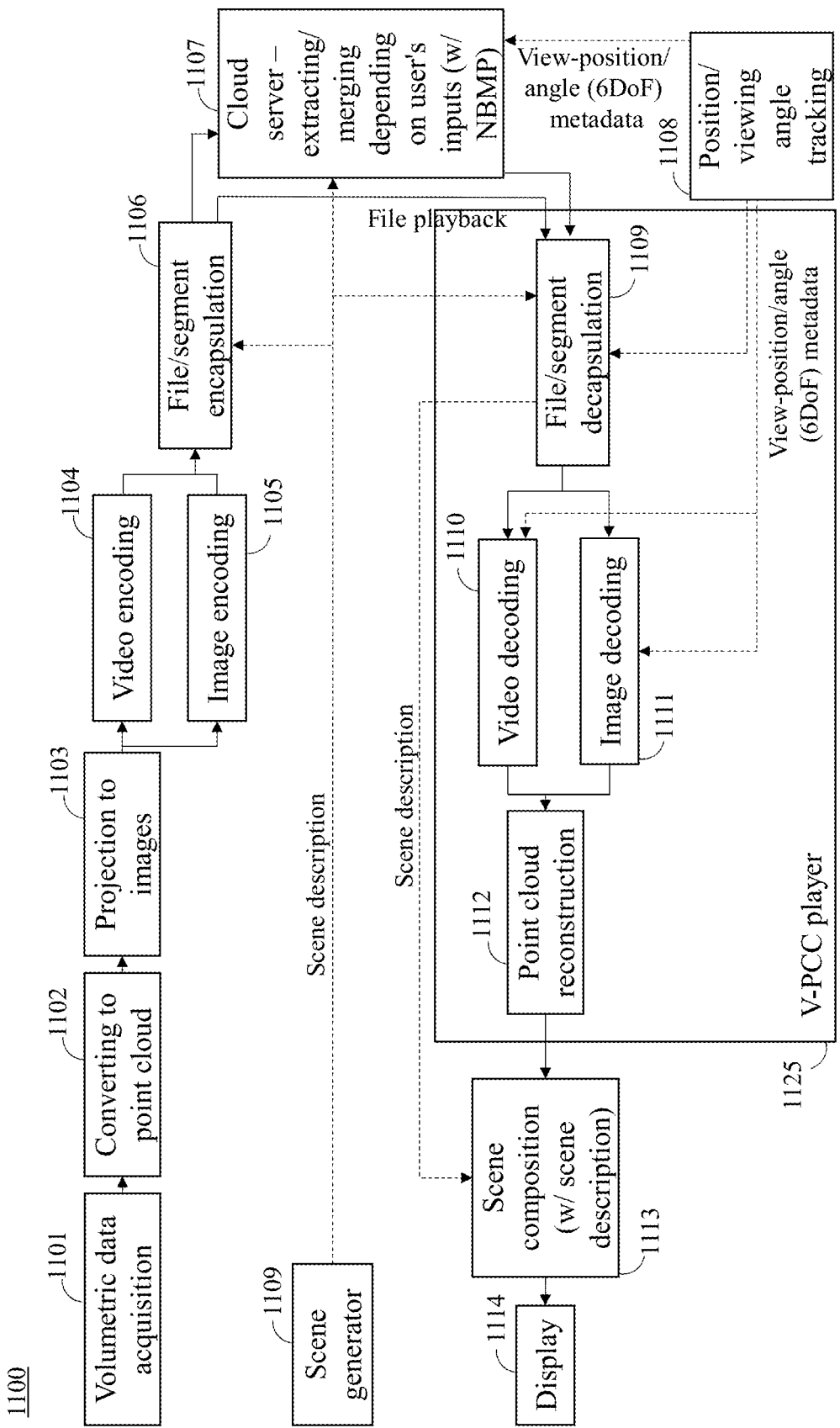

FIG. 11 illustrates a simplified block-style content flow process diagram 1100 for (coded) point cloud data with view-position and angle dependent processing of point cloud data (herein "V-PCC") with respect to capturing/generating/(de)coding/rendering/displaying 6 degree-of-freedom media. It is to be understood that the described features may be used separately or combined in any order and elements such as for encoding and decoding, among others illustrated, may be implemented by processing circuitry (e.g., one or more processors or one or more integrated circuits), and the one or more processors may execute a program that is stored in a non-transitory computer-readable medium according to exemplary embodiments.

The diagram 1100 illustrates exemplary embodiments for streaming of coded point cloud data according to V-PCC.

At the volumetric data acquisition block 1101, a real-world visual scene or a computer-generated visual scene (or combination of them) may be captured by a set of camera devices or synthesized by a computer as a volumetric data, and the volumetric data, which may have an arbitrary format, may be converted to a (quantized) point cloud data format, through image processing at the converting to point cloud block 1102. For example, data from the volumetric data may be area data by area data converted into ones of points of the point cloud by pulling one or more of the values described below from the volumetric data and any associated data into a desired point cloud format according to exemplary embodiments. According to exemplary embodiments, the volumetric data may be a 3D data set of 2D images, such as slices from which a 2D projection of the 3D data set may be projected for example. According to exemplary embodiments, point cloud data formats include representations of data points in one or more various spaces and may be used to represent the volumetric data and may offer improvements with respect to sampling and data compression, such as with respect to temporal redundancies, and, for example, a point cloud data in an x, y, z, format representing, at each point of multiple points of the cloud data, color values (e.g., RGB, etc.), luminance, intensity, etc. and could be used with progressive decoding, polygon meshing, direct rendering, octree 3D representations of 2D quadtree data.

At projection to images block 1103, the acquired point cloud data may be projected onto 2D images and encoded as image/video pictures with video-based point cloud coding (V-PCC). The projected point cloud data may be composed of attributes, geometry, occupancy map, and other metadata used for point cloud data reconstruction such as with painter's algorithms, ray casting algorithms, (3D) binary space partition algorithms, among others for example.

At the scene generator block 1109, on the other hand, a scene generator may generate some metadata to be used for rendering and displaying 6 degrees-of-freedom (DoF) media, by a director's intention or a user's preference for example. Such 6 DoF media may include the 360VR like 3D viewing of a scene from rotational changes on 3D axis X, Y, Z in addition to additional dimension allowing for movement front/back, up/down, and left/right with respect to a virtual experience within or at least according to point cloud coded data. The scene description metadata defines one or more scene composed of the coded point cloud data and other media data, including VR360, light field, audio, etc. and may be provided to one or more cloud servers and or file/segment encapsulation/decapsulation processing as indicated in FIG. 11 and related descriptions.

After video encoding block 1104 and image encoding block 1105 similar to the video and image encoding described above (and as will be understood, audio encoding also may be provided as described above), file/segment encapsulation block 1106 processes such that the coded point cloud data are composed into a media file for file playback or a sequence of an initialization segment and media segments for streaming according to a particular media container file format such as one or more video container formats and such as may be used with respect to DASH described below, among others as such descriptions represent exemplary embodiments. The file container also may include the scene description metadata, such as from the scene generator block 1109, into the file or the segments.

According to exemplary embodiments, the file is encapsulated depending on the scene description metadata to include at least one view position and at least one or more angle views at that/those view position(s) each at one or more times among the 6DoF media such that such file may be transmitted on request depending on user or creator input. Further, according to exemplary embodiments, a segment of such file may include one or more portions of such file such as a portion of that 6DoF media indicating a single viewpoint and angle thereat at one or more times; however, these are merely exemplary embodiments and may be changed depending on various conditions such as network, user, creator capabilities and inputs.

According to exemplary embodiments, the point cloud data is partitioned into multiple 2D/3D regions, which are independently coded such as at one or more of video encoding block 1104 and image encoding block 1105. Then, each independently coded partition of point cloud data may encapsulated at file/segment encapsulation block 1106 as a track in a file and/or segment. According to exemplary embodiments, each point cloud track and/or a metadata track may include some useful metadata for view-position/angle dependent processing.

According to exemplary embodiments, the metadata, such as included in a file and/or segment encapsulated with respect to the file/segment encapsulation block, useful for the view-position/angle dependent processing includes one or more of the following: layout information of 2D/3D partitions with indices, (dynamic) mapping information associating a 3D volume partition with one or more 2D partitions (e.g. any of a tile/tile group/slice/sub-picture), 3D positions of each 3D partition on a 6DoF coordinate system, representative view position/angle lists, selected view position/angle lists corresponding to a 3D volume partition, indices of 2D/3D partitions corresponding to a selected view position/angle, quality (rank) information of each 2D/3D partition, and rendering information of each 2D/3D partition for example depending on each view position/angle. Calling on such metadata when requested, such as by a user of the V-PCC player or as directed by a content creator for the user of the V-PCC player, may allow for more efficient processing with respect to specific portions of the 6DoF media desired with respect to such metadata such that the V-PCC player may deliver higher quality images of focused on portions of the 6DoF media than other portions rather than delivering unused portions of that media.

From the file/segment encapsulation block 1106, the file or one or more segments of the file may be delivered using a delivery mechanism (e.g., by Dynamic Adaptive Streaming over HTTP (DASH)) directly to any of the V-PCC player 1125 and a cloud server, such as at the cloud server block 1107 at which the cloud server can extract one or more tracks and/or one or more specific 2D/3D partitions from a file and may merge multiple coded point cloud data into one data.

According to data such as with the position/viewing angle tracking block 1108, if the current viewing position and angle(s) is/are defined on a 6DoF coordinate system, at a client system, then the view-position/angle metadata may be delivered, from the file/segment encapsulation block 1106 or otherwise processed from the file or segments already at the cloud server, at cloud server block 1107 such that the cloud sever may extract appropriate partition(s) from the store file(s) and merge them (if necessary) depending on the metadata from the client system having the V-PCC player 1125 for example, and the extracted data can be delivered to the client, as a file or segments.

With respect to such data, at the file/segment decapsulation block 1109, a file decapsulator processes the file or the received segments and extracts the coded bitstreams and parses the metadata, and at video decoding and image decoding blocks, the coded point cloud data are then decoded into decoded and reconstructed, at point cloud reconstruction block 1112, to point cloud data, and the reconstructed point cloud data can be displayed at display block 1114 and/or may first be composed depending on one or more various scene descriptions at scene composition block 1113 with respect to scene description data according to the scene generator block 1109.

In view of the above, such exemplary V-PCC flow represents advantages with respect to a V-PCC standard including one or more of the described partitioning capabilities for multiple 2D/3D areas, a capability of a compressed domain assembly of coded 2D/3D partitions into a single conformant coded video bitstream, and a bitstream extraction capability of coded 2D/3D of a coded picture into conformant coded bitstreams, where such V-PCC system support is further improved by including container formation for a VVC bitstream to support a mechanism to contain metadata carrying one or more of the above-described metadata.

In that light and according to exemplary embodiments further described below, the term "mesh" indicates a composition of one or more polygons that describe the surface of a volumetric object. Each polygon is defined by its vertices in 3D space and the information of how the vertices are connected, referred to as connectivity information. Optionally, vertex attributes, such as colors, normals, etc., could be associated with the mesh vertices. Attributes could also be associated with the surface of the mesh by exploiting mapping information that parameterizes the mesh with 2D attribute maps. Such mapping may be described by a set of parametric coordinates, referred to as UV coordinates or texture coordinates, associated with the mesh vertices. 2D attribute maps are used to store high resolution attribute information such as texture, normals, displacements etc. Such information could be used for various purposes such as texture mapping and shading according to exemplary embodiments.

Nonetheless, a dynamic mesh sequence may require a large amount of data since it may consist of a significant amount of information changing over time. Therefore, efficient compression technologies are required to store and transmit such contents. Mesh compression standards IC, MESHGRID, FAMC were previously developed by MPEG to address dynamic meshes with constant connectivity and time varying geometry and vertex attributes. However, these standards do not take into account time varying attribute maps and connectivity information. DCC (Digital Content Creation) tools usually generate such dynamic meshes. In counterpart, it is challenging for volumetric acquisition techniques to generate a constant connectivity dynamic mesh, especially under real time constraints. This type of contents is not supported by the existing standards. According to exemplary embodiments herein, there is described aspects of a new mesh compression standards to directly handle dynamic meshes with time varying connectivity information and optionally time varying attribute maps, this standard targets lossy, and lossless compression for various applications, such as real-time communications, storage, free viewpoint video, AR and VR. Functionalities such as random access and scalable/progressive coding are also considered.

Figure 12:
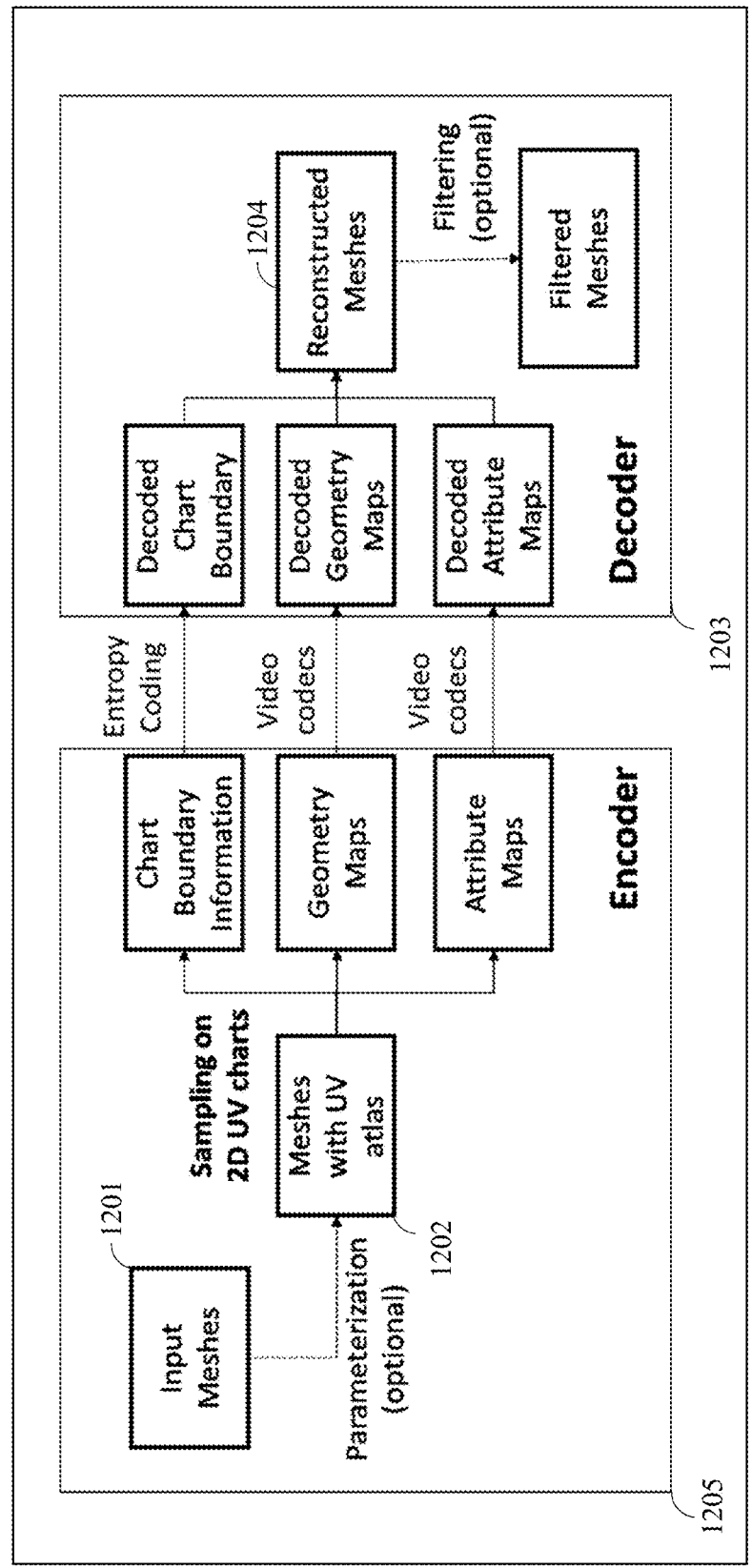
FIG. 12 is a simplified block diagram in accordance with embodiments.

FIG. 12 represents an example framework 1200 of one dynamic mesh compression such as for a 2D atlas sampling based method. Each frame of the input meshes 1201 can be preprocessed by a series of operations, e.g., tracking, remeshing, parameterization, voxelization. Note that, these operations can be encoder-only, meaning they might not be part of the decoding process and such possibility may be signaled in metadata by a flag such as indicating 0 for encoder only and 1 for other. After that, one can get the meshes with 2D UV atlases 1202, where each vertex of the mesh has one or more associated UV coordinates on the 2D atlas. Then, the meshes can be converted to multiple maps, including the geometry maps and attribute maps, by sampling on the 2D atlas. Then these 2D maps can be coded by video/image codecs, such as HEVC, VVC, AV1, AVS3, etc. On the decoder 1203 side, the meshes can be reconstructed from the decoded 2D maps. Any post-processing and filtering can also be applied on the reconstructed meshes 1204. Note that other metadata might be signaled to the decoder side for the purpose of 3D mesh reconstruction. Note that the chart boundary information, including the uv and xyz coordinates, of the boundary vertices can be predicted, quantized and entropy coded in the bitstream. The quantization step size can be configured in the encoder side to tradeoff between the quality and the bitrates.

Figure 16:
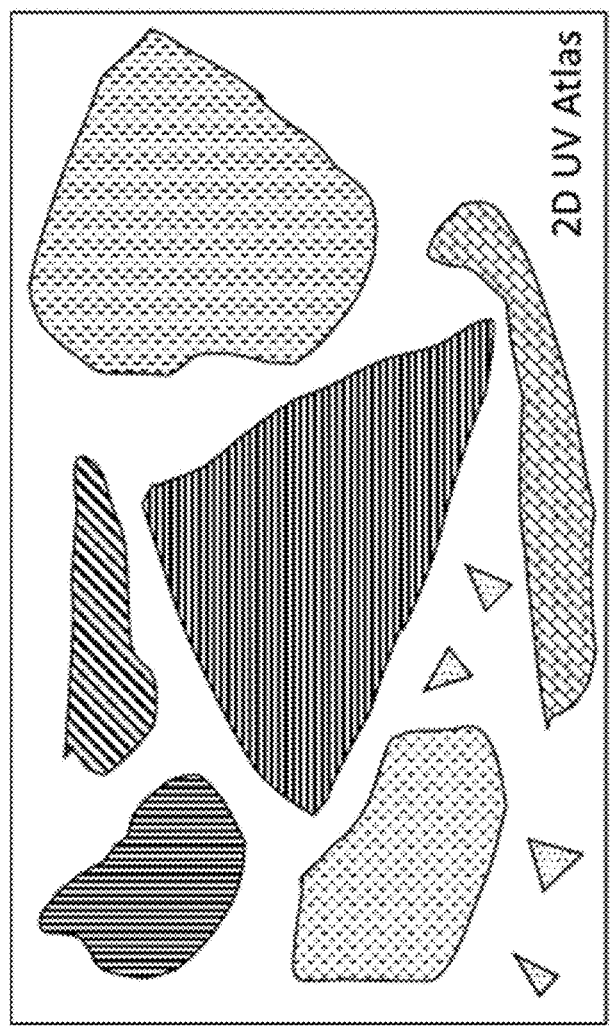
FIG. 16 is a simplified diagram in accordance with embodiments.
Figure 17:
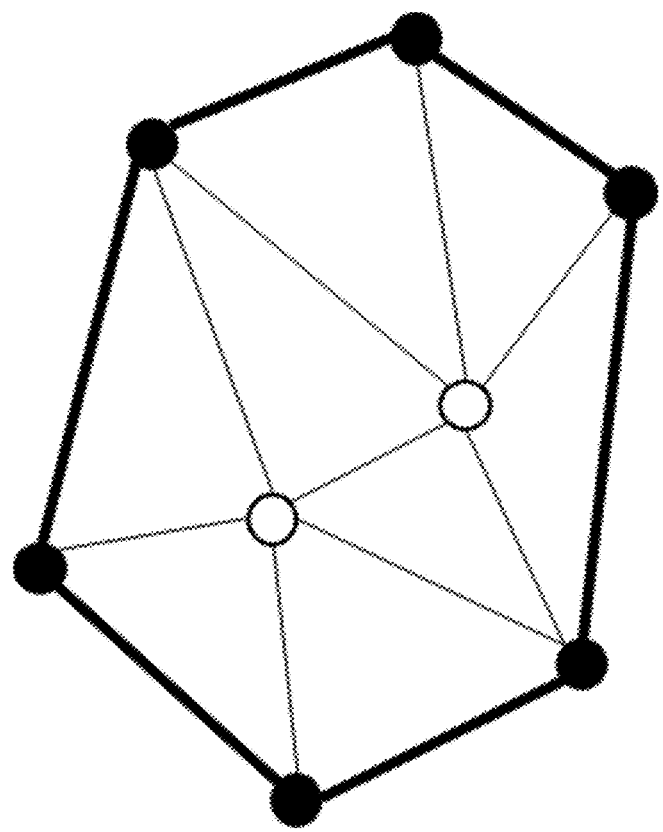
FIG. 17 is a simplified diagram in accordance with embodiments.

In some implementations, a 3D mesh can be partitioned into several segments (or patches/charts). Each segment is composed of a set of connected vertices associated with their geometry, attribute, and connectivity information. As illustrated in the example 1300 of FIG. 13, the UV parameterization process 1302 of mapping from 3D mesh segments onto 2D charts, such as to the above noted 2D UV atlases 1202 block, maps one or more mesh segments 1301 onto a 2D chart 1303 in the 2D UV atlas 1304. Each vertex (vn) in the mesh segment will be assigned with a 2D UV coordinates in the 2D UV atlas. Note that the vertices (vn) in a 2D chart form a connected component as their 3D counterpart. The geometry, attribute, and connectivity information of each vertex can be inherited from their 3D counterpart as well. For example, information may be indicated that vertex $v_4$ connects directly to vertices $v_0$, $v_5$, $v_1$, and $v_3$, and similarly information of each of the other vertices may also be likewise indicated. Further, such 2D texture mesh would, according to exemplary embodiments, further indicate information, such as color information, in a patch-by-patch basis such as by patches of each triangle, e.g., $v_2$, $v_5$, $v_3$, shown with respect to at least the UV parametric features of the example 1600 of FIG. 16, and see also the example 1700 of FIG. 17 showing an illustration of boundary vertices in a 2D chart.

Figure 13:
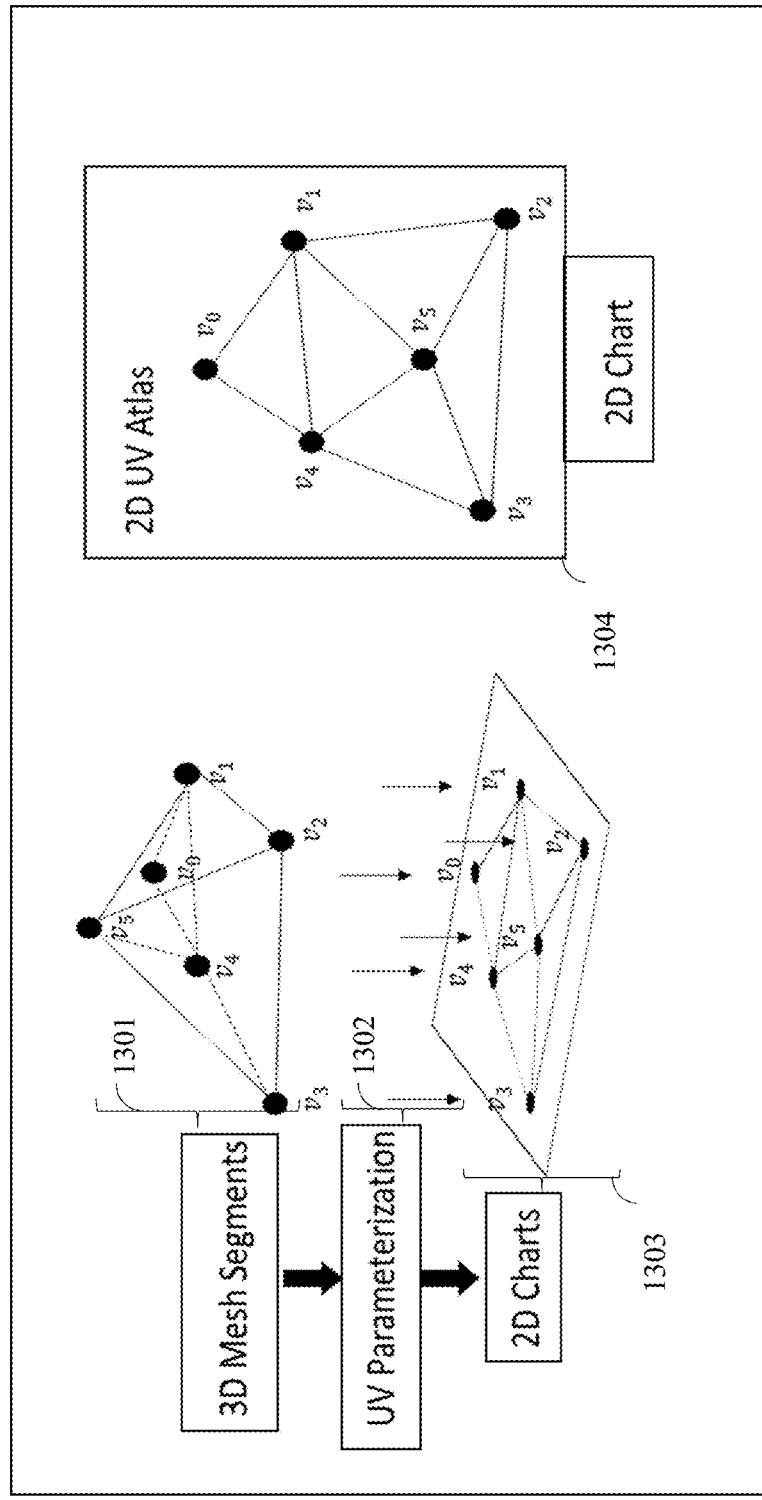
FIG. 13 is a simplified diagram in accordance with embodiments.
Figure 14:
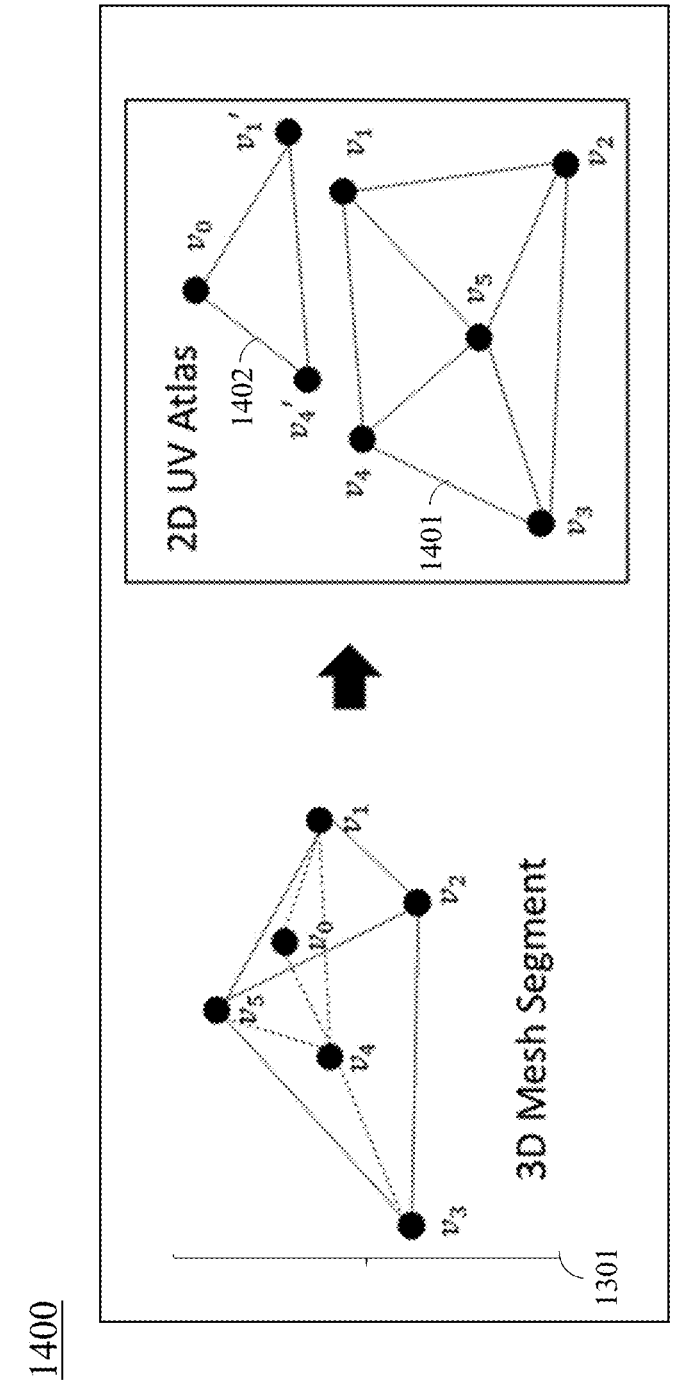
FIG. 14 is a simplified diagram in accordance with embodiments.

For example, further to the features of the example 1300 of FIG. 13, see the example 1400 of FIG. 14 where the 3D mesh segment 1301 can be also mapped to multiple separate 2D charts 1401 and 1402. In this case, a vertex in 3D could corresponds to multiple vertices in 2D UV atlas. As shown in FIG. 14, the same 3D mesh segment is mapped to multiple 2D charts, instead of a single chart as in FIG. 13, in the 2D UV atlas. For example, 3D vertices $v_1$ and $v_4$ each have two 2D correspondences $v_1$, $v_{1'}$, and $v_4$, $v_{4'}$, respectively. As such, a general 2D UV atlas of a 3D mesh may consist of multiple charts as shown in FIG. 14, where each chart may contain multiple (usually more than or equal to 3) vertices associated with their 3D geometry, attribute, and connectivity information.

Figure 15:
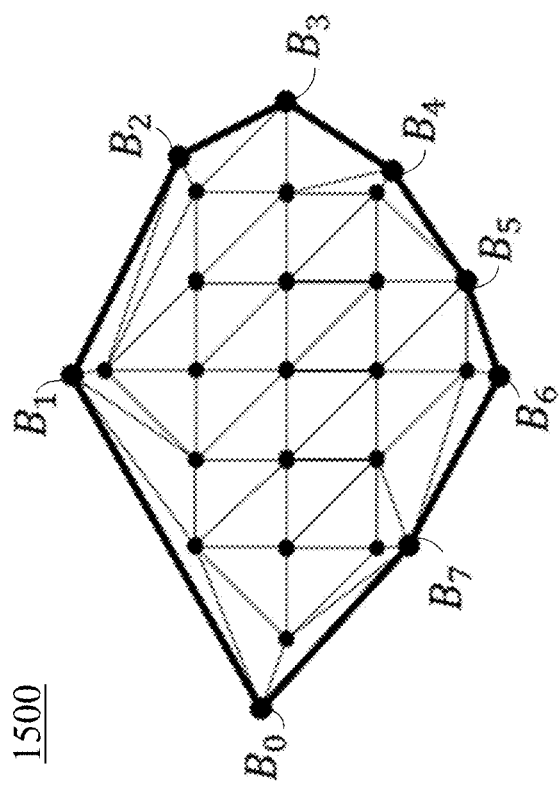
FIG. 15 is a simplified diagram in accordance with embodiments.

FIG. 15 shows an example 1500 illustrating a derived triangulation in a chart with boundary vertices $B_0$, $B_1$, $B_2$, $B_3$, $B_4$, $B_5$, $B_6$, $B_7$. When presented with such information, any triangulation method can be applied to create connectivity among the vertices (including boundary vertices and sampled vertices). For example, for each vertex, find the closest two vertices. Or for all vertices, continuously generate triangles until a minimum number of triangles is achieved after a set number of tries. As shown in the example 1500, there are various regularly shaped, repeating triangles and various oddly shaped triangles, generally closest to the boundary vertices, having their own unique dimensions that may or may not be shared with any other of the triangles. The connectivity information can be also reconstructed by explicit signaling. If a polygon cannot be recovered by implicit rules, the encoder can signal the connectivity information in the bitstream according to exemplary embodiments.

Viewing the above-described patches, the example 1500 may represent one such patch, such a patch formed of vertices $v_3$, $v_2$, $v_5$ shown in any of FIGS. 14 and 15.

Boundary vertices $B_0$, $B_2$, $B_2$, $B_3$, $B_4$, $B_5$, $B_6$, $B_7$ are defined in the 2D UV space. As shown in FIG. 15, the filled vertices are boundary vertices because they are on the boundary edges of a connected component (a patch/chart). A boundary edge can be determined by checking if the edge is only appeared in one triangle. The following information of boundary vertices is significant and should be signaled in the bitstream according to exemplary embodiments: geometry information, e.g., the 3D XYZ coordinates even though currently in the 2D UV parametric form, and the 2D UV coordinates.

For a case in which a boundary vertex in 3D corresponds to multiple vertices in 2D UV atlas, such as shown in FIG. 14, the mapping from 3D XYZ to 2D UV can be one-to-multiple. Therefore, a UV-to-XYZ (or referred to as UV2XYZ) index can be signaled to indicate the mapping function. UV2XYZ may be a 1D-array of indices that correspond each 2D UV vertex to a 3D XYZ vertex.

According to exemplary embodiments, to represent a mesh signal efficiently, a subset of the mesh vertices may be coded first, together with the connectivity information among them. In the original mesh, the connection among these vertices may not exist as they are subsampled from the original mesh. There are different ways to signal the connectivity information among the vertices, and such subset is therefore referred to as the base mesh or as base vertices.

Figure 18:
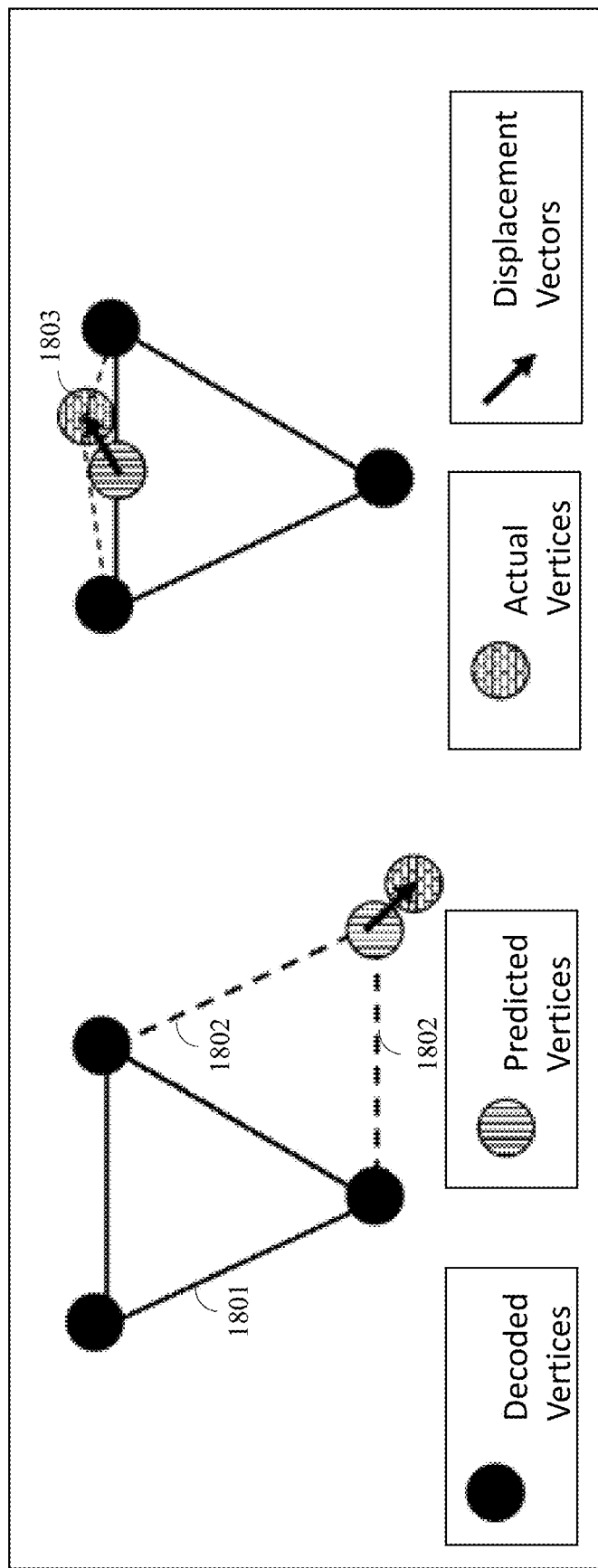
FIG. 18 is a simplified diagram in accordance with embodiments.

Other vertices, however, can be predicted by applying interpolation between two or more already decoded mesh vertices. A predictor vertex will have its geometry location along the edge of two connected existing vertices, so the geometry information of the predictor can be calculated based on the neighboring decoded vertices. In some cases, the displacement vector or prediction error, from the to-be-coded vertex to the vertex predictor, is to be further coded. For example, see the example 1800 of FIG. 18, an example of such edge-based vertex prediction is shown or more specifically of vertex geometry prediction using intra prediction by extrapolation by extending a triangle to a parallelogram, as shown on the left, and interpolation by weighted averaging of two existing vertices as shown in the right. After decoding the base vertices (i.e. the solid triangle 1801 in FIG. 18 left), interpolation among these base vertices can be done along the connected edges. For example, the middle point of each edge can be generated as predictors. The geometry locations of these interpolated points are therefore (weighted) average of the two neighboring decoded vertices (the dashed points 1802 in FIG. 18 left). Having more than 1 middle point between two already decoded vertices can also be done in a similar way. The actual vertices to be coded can therefore be reconstructed by adding the displacement vectors to the predictors (FIG. 7 middle). After decoding these additional vertices, the connection among the newly decoded vertices and the existing base vertices are still maintained. In addition, connection among the newly decoded vertices can be further established. Together with the base vertices, more intermediate vertices predictors can be generated along the new edges (FIG. 7 right) by connecting these newly decoded vertices 1803 and base vertices together. Therefore, more actual vertices to be decoded are present with associated displacement vectors.

Figure 19:
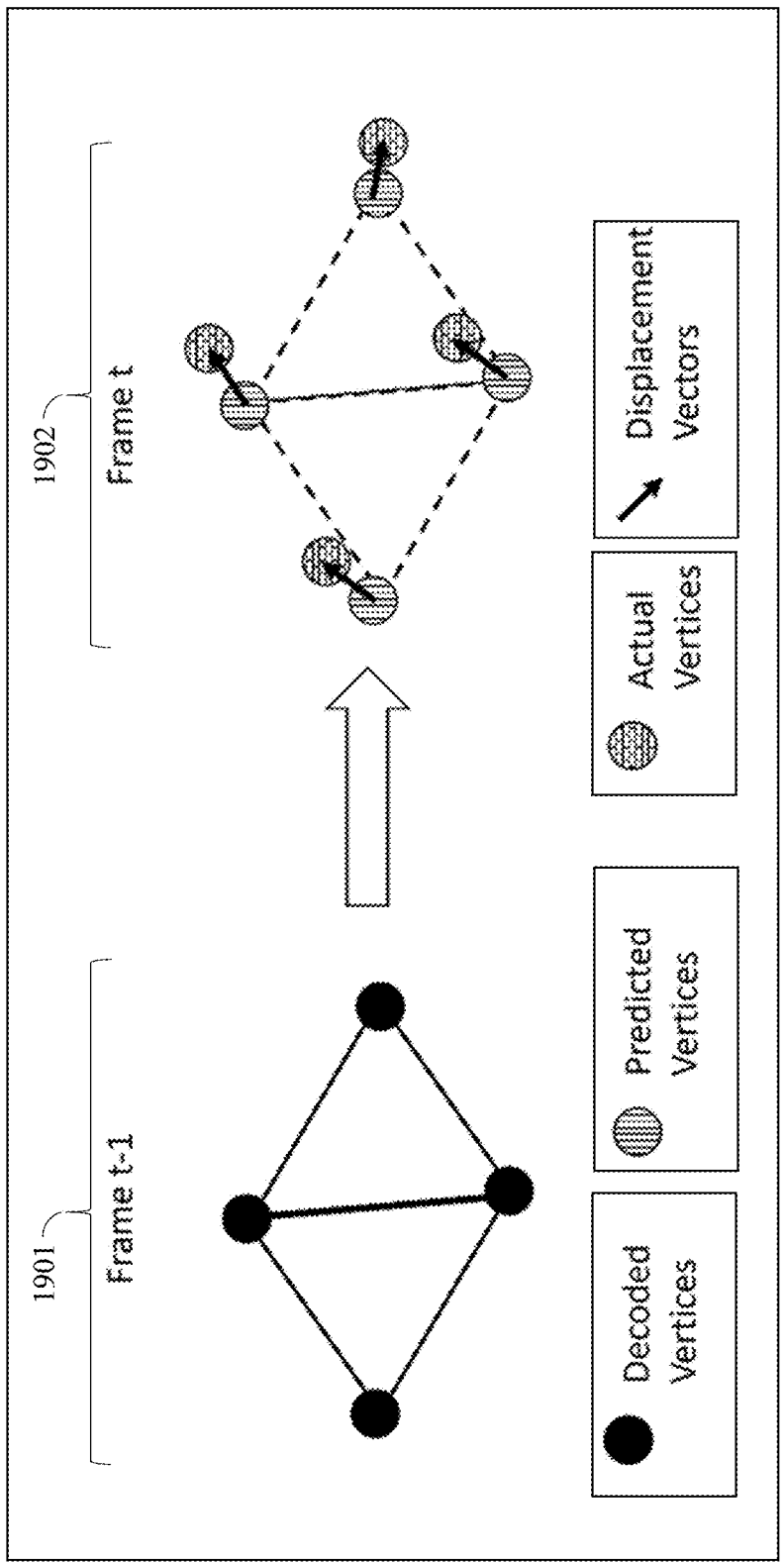
FIG. 19 is a simplified diagram in accordance with embodiments.

According to exemplary embodiments, mesh vertices of a mesh frame 1902 can also be predicted from decoded vertices of a previously coded mesh frame 1901. This prediction mechanism is referred to as inter prediction. Examples of mesh geometry inter prediction are illustrated in the example 1900 of FIG. 19 showing vertex geometry prediction using inter prediction (previous mesh frame's vertices become predictors of current frame's vertices). In some cases, the displacement vector or prediction error, from the to-be-coded vertex to the vertex predictor, is to be further coded.

According to exemplary embodiments, a number of methods are implemented for dynamic mesh compression and are part of the above-mentioned edge-based vertex prediction framework, where a base mesh is coded first and then more additional vertices are predicted based on the connectivity information from the edges of the base mesh. Note that they can be applied individually or by any form of combinations.

Figure 20:
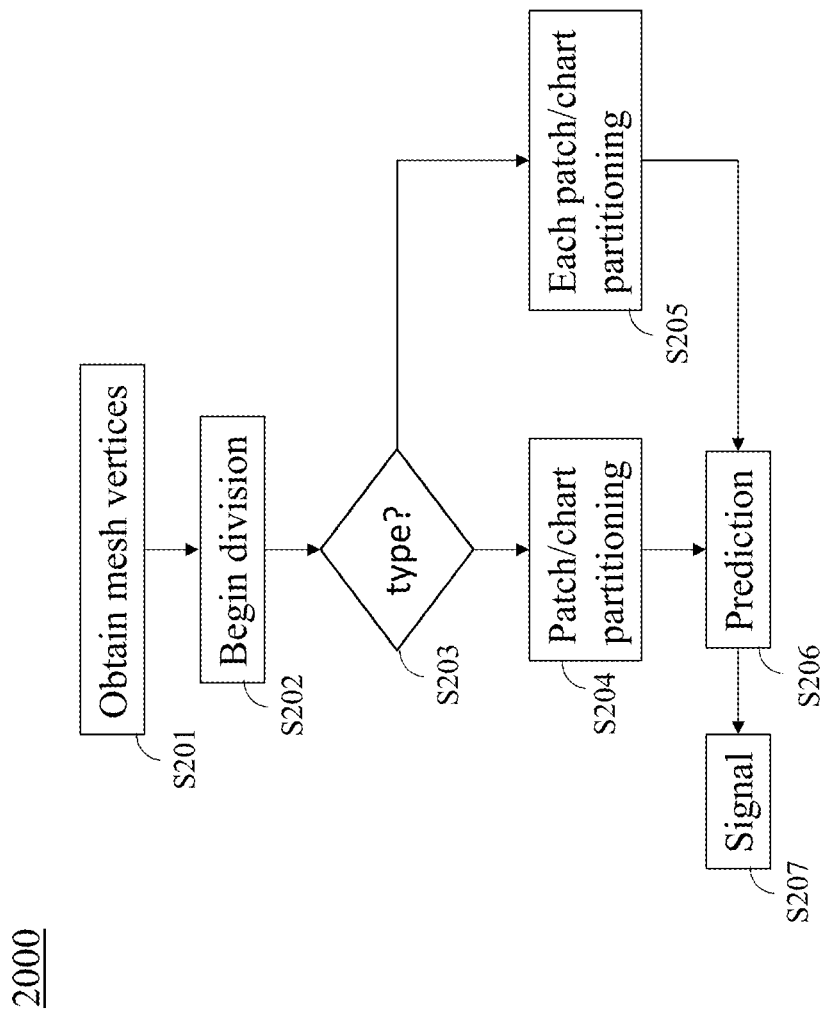
FIG. 20 is a simplified flowchart in accordance with embodiments.

For example, consider the vertex grouping for prediction mode example flowchart 2000 of FIG. 20. At S201, vertices inside a mesh may be obtained and can be divided at S202 into different groups for prediction purposes, for example see FIG. 15. In one example, the division is done using the patch/chart partitioning at S204 as previously discussed. In another example, the division is done under each patch/chart S205. The decision S203 whether to proceed to S204 or S205 may be signaled by a flag or the like. In the case of S205, several vertices of the same patch/chart form a prediction group and will share the same prediction mode, while several other vertices of the same patch/chart can use another prediction mode. The grouping can be assigned at different level in terms of number of vertices involved. For example, every 64, 32 or 16 vertices following a scan order inside a patch/chart will be assigned the same prediction mode according to exemplary embodiments and other vertices may be differently assigned. For each group, a prediction mode can be intra prediction mode or inter prediction mode. This can be signaled or assigned. According to the example flowchart 2000, if a mesh frame or mesh slice is determined to be in intra type, all groups of vertices inside this mesh frame or mesh slice shall use intra prediction mode; otherwise, each group can choose either intra prediction or inter prediction mode.

Further, for a group of mesh vertices using intra prediction mode, its vertices can only be predicted by using previously coded vertices inside the same sub-partition of the current mesh. Sometimes the sub-partition can be the current mesh itself according to exemplary embodiments, and for a group of mesh vertices using inter prediction mode, its vertices can only be predicted by using previously coded vertices from another mesh frame according to exemplary embodiments. Each of the above-noted information may be determined and signaled by a flag or the like. Said prediction features may occur at S206 and results of said prediction and signaling may occur at S207.

According to exemplary embodiments, for each vertex in a group of vertices in the example flowchart 2000 and in the flowchart 2100 described below, after prediction, the residue will be a 3D displacement vector, indicating the shift from the current vertex to its predictor. The residues of a group of vertices need to be further compressed. In one example, transformation can be applied to the residues of a vertex group, before entropy coding. The following methods may be implemented to handle the coding of a group of displacement vectors. For example, in one method, to properly signal the case where a group of displacement vectors, some displacement vectors, or its components have only zero values. In another embodiment, a flag is signaled for each displacement vectors whether this vector has any non-zero component, and if no, the coding of all components for this displacement vector can be skipped. Further, in another embodiment, a flag is signaled for each group of displacement vectors whether this group has any non-zero vectors, and if no, the coding of all displacement vectors of this group can be skipped. Further, in another embodiment, a flag is signaled for each component of a group of displacement vectors whether this component of the group has any non-zero vectors, and if no, the coding of this component of all displacement vectors s of this group can be skipped. Further, in another embodiment, there may be a signaling of the case where a group of displacement vectors, or a component of the group of displacement vectors, needs a transformation, and if not, the transformation can be skipped, and quantization/entropy coding can be directly applied to the group or the group components. Further, in another embodiment, a flag may be signaled for each group of displacement vectors whether this group needs to go through transformation, and if no, the transform coding of all displacement vectors of this group can be skipped. Further, in another embodiment, a flag is signaled for each component of a group of displacement vectors whether this component of the group needs to go through transformation, and if no, the transform coding of this component of all displacement vectors of this group can be skipped. The above-described embodiments in this paragraph, which regard handling of vertex prediction residues, may also be combined and implemented in parallel on different patches respectively.

Figure 21:
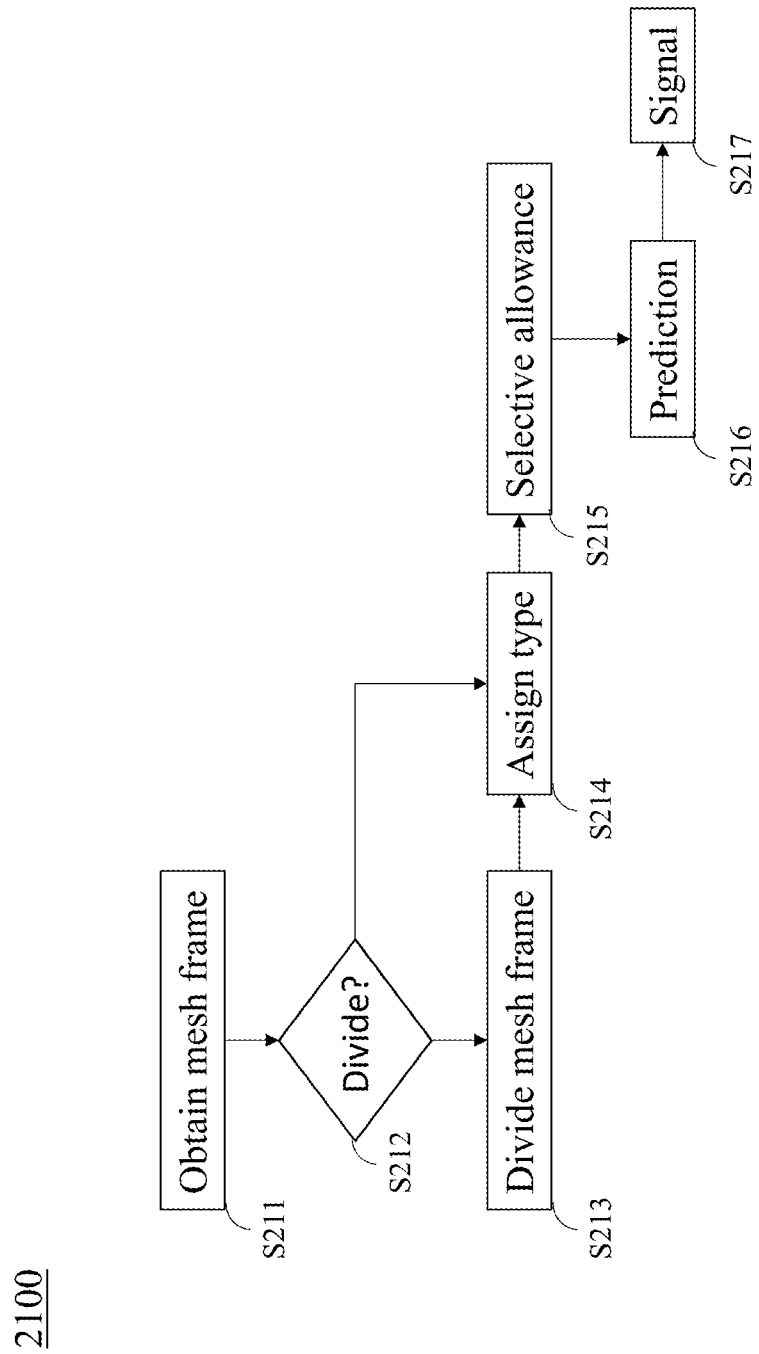
FIG. 21 is a simplified flowchart in accordance with embodiments.

FIG. 21 shows the example flowchart 2100 where, at S211 a mesh frame can be obtained coded as an entire data unit, meaning all vertices or attributes of the mesh frame may have correlation among them. Alternatively, depending on a determination at S212, a mesh frame can be divided at S213 into smaller independent sub-partitions, similar in concept to slices or tiles in 2D videos or images. A coded mesh frame or a coded mesh sub-partition can be assigned with a prediction type at S214. Possible prediction types include intra coded type and inter coded type. For intra coded type, only predictions from the reconstructed parts of the same frame or slice are allowed at S215. On the other hand, an inter prediction type will allow at S215 predictions from a previously coded mesh frame, in addition to intra mesh frame predictions. Further, inter prediction type may be classified with more sub-types such as P type or B type. In P type, only one predictor can be used for prediction purposes, while in B type, two predictors, from two previously coded mesh frames, may be used to generate the predictor. Weighted average of the two predictors can be one example. When the mesh frame is coded as a whole, the frame can be regarded as an intra or inter coded mesh frame. In case of inter mesh frame, P or B type may be further identified via signaling. Or, if a mesh frame is coded with further splitting inside a frame, assign prediction type for each of the sub-partitions occurs at S214. Each of the above-noted information may be determined and signaled by a flag or the like, and like with S206 and S207 of FIG. 20, said prediction features may occur at S216 and results of said prediction and signaling may occur at S217.

As such, although dynamic mesh sequence may require a large amount of data since it may consist of a significant amount of information changing over time, efficient compression technologies are required to store and transmit such contents, and the above described features for FIGS. 20 and 21 represent such improved efficiencies by allowing at least for improved mesh vertex 3D location prediction by either using previously decoded vertices in the same mesh frame (intra prediction) or from a previous coded mesh frame (inter prediction).

Figure 23:
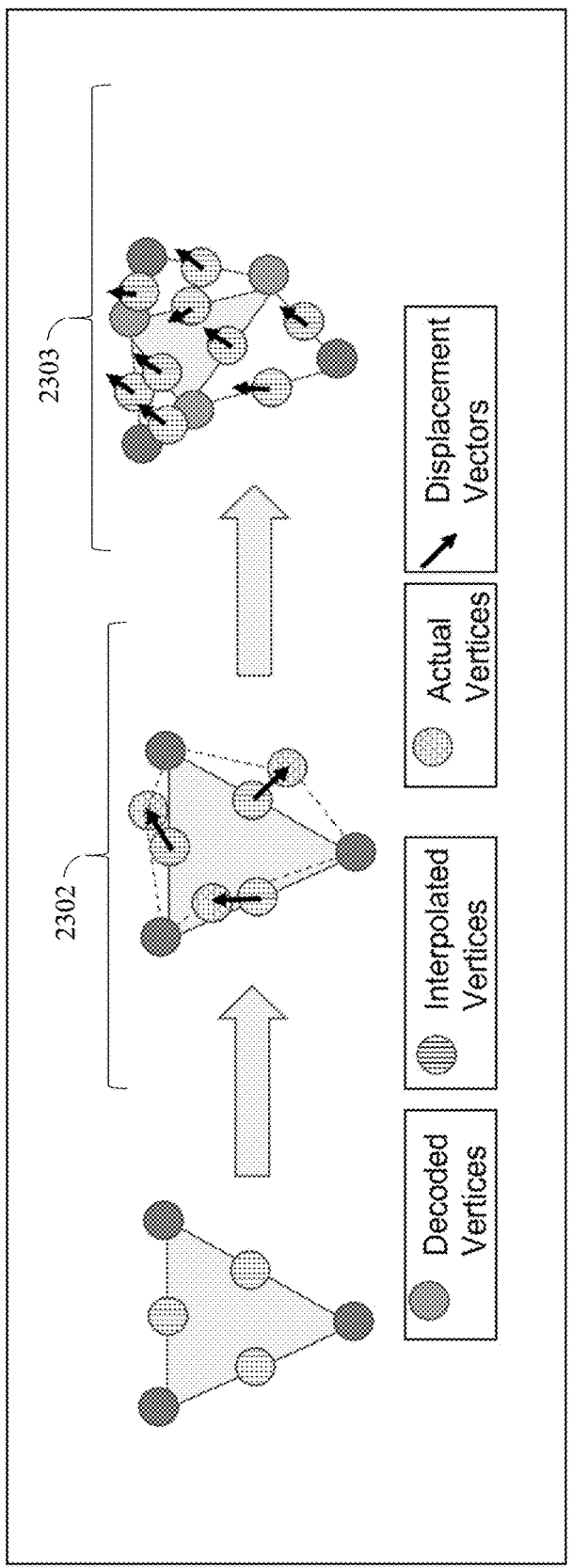
FIG. 23 is a simplified diagram in accordance with embodiments.

Further, exemplary embodiments may generate the displacement vectors of one layer 2302, based on the reconstructed vertices of its previous layer(s) 2302. Assuming the index of the current layer 2302 is T, the predictors for vertices in layer 2303 T+1 are generated based on the reconstructed vertices of the current layer 2302. An example of such layer based prediction structure is shown example 2300 in FIG. 23 which illustrates reconstruction based vertex prediction: progressive vertex prediction using edge-based interpolation, where predictors are generated based on previously decoded vertices, not predictor vertices.

Figure 22:
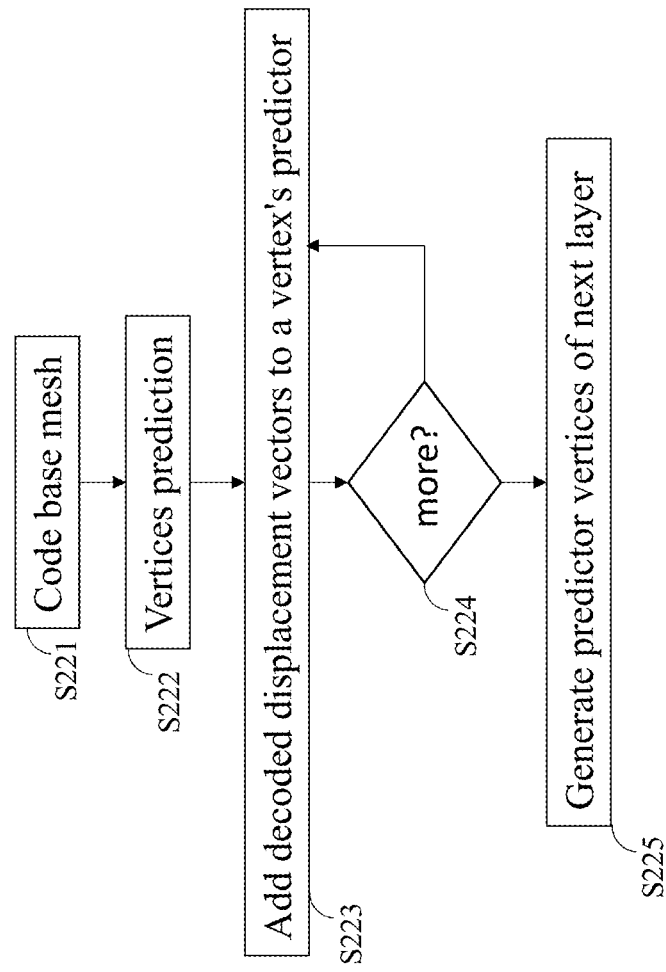
FIG. 22 is a simplified flowchart in accordance with embodiments.

For such example 2300, see the example flowchart 2200 of FIG. 22 where since the interpolated vertices on the current layer are predicted values, such values need to be reconstructed, before being used to generate predictors of vertices on the next layer. This is done by coding a base mesh at S221, implementing vertices prediction as such at S222, then at S223 adding the decoded displacement vectors of the current layer to the vertex's predictors, such as of layer 2302. Then the reconstructed vertices of this layer 2303, together with all decoded vertices of previous layer(s), such as checking for addition vertices values of such layers at S224, can be used to generate the predictor vertices of next layer 2303 at S225. This process can also be summarized as follows: Let P[t](Vi) represent the predictor of vertex Vi on a layer t; let R[t](Vi) represent the reconstructed vertex Vi on layer t; let D[t](Vi) represent the displacement vector of vertex Vi on layer t; let f(*) represent the predictor generator, which, in particular, can be the average of the two existing vertices. Then for each layer t, there is the following according to exemplary embodiments:

$$P[t](Vi)=f(R[s|s<t](Vj),R[m|m<t](Vk)), \text{ where}$$

Vj and Vk are reconstructed vertices of previous layers $$R[t](Vi)=P[t](Vi)+D[t](Vi) \qquad \text{Eq. (1)}$$

Then, for all vertices in one mesh frame, divide them into layer 0 (the base mesh), layer 1, layer 2, . . . . Etc. Then the reconstruction of vertices on one layer relies on the reconstruction of those on previous layer(s). In the above, each of P, R and D represents a 3D vector under the context of 3D mesh representation. D is the decoded displacement vector, and quantization may or may not apply to this vector.

According to exemplary embodiments, the vertex prediction using reconstructed vertices may only apply to certain layers. For example, layer 0 and layer 1. For other layers, the vertex prediction can still use neighboring predictor vertices without adding displacement vectors to them for reconstruction. So that these other layers can be processed at the same time without waiting one previous layer to reconstruct. According to exemplary embodiments, for each layer, whether to choose reconstruction based vertex prediction or predictor based vertex prediction, can be signaled, or the layer (and its subsequent layers) that does not use reconstruction based vertex prediction, can be signaled.

For the displacement vectors whose vertex predictors are generated by reconstructed vertices, quantization can be applied to them, without further performing transformation, such as wavelet transform, etc. For the displacement vectors whose vertex predictors are generated by other predictor vertices, transformation may be needed and quantization can be applied to the transform coefficients of those displacement vectors.

As such, since a dynamic mesh sequence may require a large amount of data since it may consist of a significant amount of information changing over time. Therefore, efficient compression technologies are required to store and transmit such contents. In the framework of interpolation-based vertex prediction method described above, one important procedure is to compress the displacement vectors, and this takes up a major part in the coded bitstream, and the focus of this disclosure, and the features of FIG. 22 for example alleviate such problem by providing for such compression.

Further, similar to the other examples described above, even with those embodiments, a dynamic mesh sequence may nonetheless require a large amount of data since it may consist of a significant amount of information changing over time, and as such, efficient compression technologies are required to store and transmit such contents. In the framework of 2D atlas sampling based methods indicated above, an important advantage may be achieved by inferring the connectivity information from the sampled vertices plus boundary vertices on decoder side. This is a major part in decoding process, and a focus of further examples described below.

According to exemplary embodiments, the connectivity information of the base mesh can be inferred (derived) from the decoded boundary vertices and the sampled vertices for each chart on both encoder and decoder sides.

As similarly described above, any triangulation method can be applied to create connectivity among vertices (including boundary vertices and sampled vertices). For charts without any sampling of internal vertices, such as with the internal vertices shown in example 1500 of FIG. 15 and example 2500 of FIG. 25 described further below, similar methods of creating connectivity still apply although, according to exemplary embodiments, it may be signaled to use different triangulation methods for boundary vertices and sampled vertices.

Figure 24:
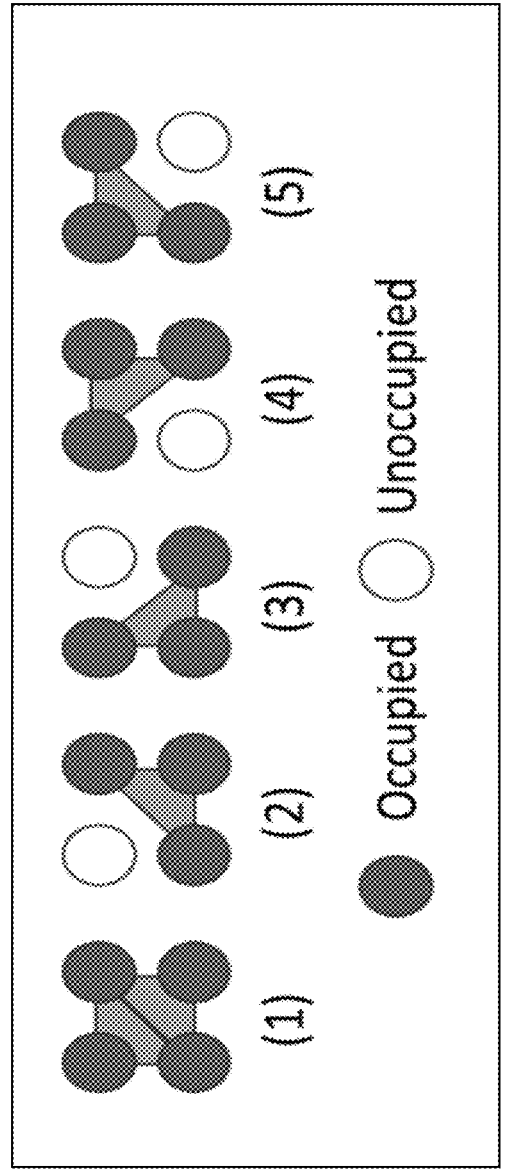
FIG. 24 is a simplified diagram in accordance with embodiments.
Figure 25:
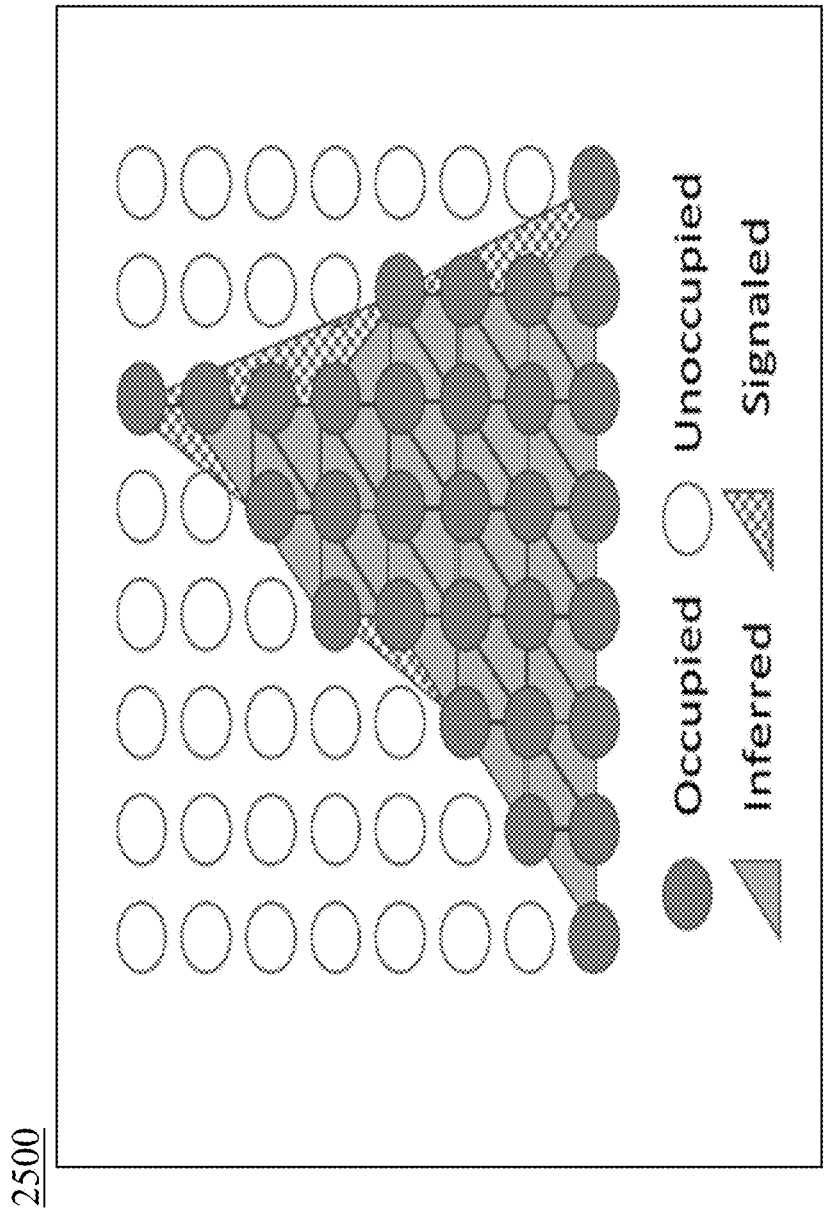
FIG. 25 is a simplified diagram in accordance with embodiments.

For example, according to exemplary embodiments, for every four neighboring points in any sampled positions, it may be determined whether a number of occupied points is larger than or equal to 3 (examples of occupied or unoccupied points are highlighted in FIG. 25 which shows an occupancy map example 2500 which each circle representing an integer pixel), and the connectivity of triangles among the 4 points can be inferred by certain rules. For example, as illustrated in the example 2400 of FIG. 24, if 3 out of 4 points are determined to be occupied, the shown examples (2), (3), (4), and (5), then those points can be interconnected directly to form a triangle as those examples; on the other hand, if 4 points are all determined to be occupied, then those points are used to form two triangles as shown in example (1) of FIG. 24 Note that different rules can be applied to different number of neighboring points. This process may be implemented across many points such as further illustrated in FIG. 25. In this embodiment, the reconstructed mesh is a triangle mesh as in FIG. 24 and as in at least as a regular triangle mesh in the internal portions of FIG. 25, which may not be determined to not be signaled according to such regularity but instead may be coded and decoded by inference rather than by individual signaling, and as irregular triangles at the perimeter which are to be signaled individually.

And in attempt to further reduce the complexity and data processing, a quad mesh of such regular internal triangles shown in FIG. 25 may be inferred as such quad mesh of the example (1) of FIG. 24 thereby reducing even the amount of complexity from inferring the internal regular triangles as instead inferring a reduced number of internal regular quad meshes.

According to exemplary embodiments, a quad mesh may be reconstructed when the 4 neighboring points are determined to be all occupied such as in the example (1) of FIG. 24.

Extrapolating from the above-descriptions, as shown in FIG. 25, it is illustrated that reconstructed mesh in the example 2500 can be a hybrid type, that is, some regions in the mesh frame generate triangle meshes while other regions generate quad meshes, and some of said triangle meshes may be regular as compared to other triangle meshes therein and some may be irregular, such as ones of the boundary though not necessary all of such meshes on the boundary.

According to exemplary embodiments, such connectivity types can be signaled in high-level syntax, such as sequence header, slice header.

As mentioned above, connectivity information can be also reconstructed by explicitly signaling, such as for the irregularly shaped triangle meshes. That is, if it is determined that a polygon cannot be recovered by implicit rules, the encoder can signal the connectivity information in the bitstream. And according to exemplary embodiments, the overhead of such explicit signaling may be reduced depending on the boundaries of polygons. For example, as shown with the example 2500 in FIG. 25, the connectivity information of triangles would be signaled to be reconstructed by both implicit rules, such as according to the regular examples 2400 in FIG. 24 which may be inferred, and explicit signaling for ones of the irregular shaped polygons shown at least on the mesh boundaries in FIG. 25.

According to embodiments, only the connectivity information between boundary vertices and sampled positions is determined to be signaled, while the connectivity information among the sampled positions themselves is inferred.

Also, in any of the embodiments, the connectivity information may be signaled by prediction, such that only the difference from the inferred connectivity (as prediction) from one mesh to another may be signaled in bitstream.

As a note, the orientation of inferred triangles (such as to be inferred in a clockwise manner or in a counterclockwise manner per triangle) can be either signaled for all charts in high-level syntax, such as sequence header, slice header, etc., or fixed (assumed) by encoder and decoder according to exemplary embodiments. The orientation of inferred triangles can be also signaled differently for each chart.

As a further note, any reconstructed mesh may have different connectivity from the original mesh. For example, the original mesh may be a triangle mesh, while the reconstructed mesh may be a polygonal mesh (e.g., quad mesh).

According to exemplary embodiments, the connectivity information of any base vertices may not be signaled and instead the edges among base vertices may be derived using the same algorithm at both encoder and decoder side. For example, see how the bottommost vertices in the example 2500 are all occupied, and therefore, the coding may take advantage of such information by therefore determining that such vertices are occupied as a base and thereby later inferring such that the connectivity information of any base vertices may not be signaled and instead the edges among base vertices may be derived using the same algorithm at both encoder and decoder side. And according to exemplary embodiments, interpolation of predicted vertices for the additional mesh vertices may be based on the derived edges of the base mesh.

According to exemplary embodiments, a flag may be used to signal whether the connectivity information of the base vertices is to be signaled or derived, and such flag can be signaled at different level of the bitstream, such as at sequences level, frame level, etc.

According to exemplary embodiments, the edges among the base vertices are first derived using the same algorithm at both encoder and decoder side. Then compared with the original connectivity of the base mesh vertices, the difference between the derived edges and the actual edges will be signaled. Therefore, after decoding the difference, the original connectivity of the base vertices can be restored.

In one example, for a derived edge, if determined to be wrong when compared to the original edge, such information may signaled in the bitstream (by indicating the pair of vertices that form this edge); and for an original edge, if not derived, may be signaled in the bitstream (by indicating the pair of vertices that form this edge). Further, connectivity on boundary edges and vertex interpolation involving boundary edges may be done separately from the internal vertices and edges.

Accordingly, by exemplary embodiments described herein, the technical problems noted above may be advantageously improved upon by one or more of these technical solutions. For example, since a dynamic mesh sequence may require a large amount of data since it may consist of a significant amount of information changing over time, and therefore, the exemplary embodiments described herein represent at least efficient compression technologies to store and transmit such contents.

The techniques described above, can be implemented as computer software using computer-readable instructions and physically stored in one or more computer-readable media or by a specifically configured one or more hardware processors. For example, FIG. 26 shows a computer system 2600 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 26:
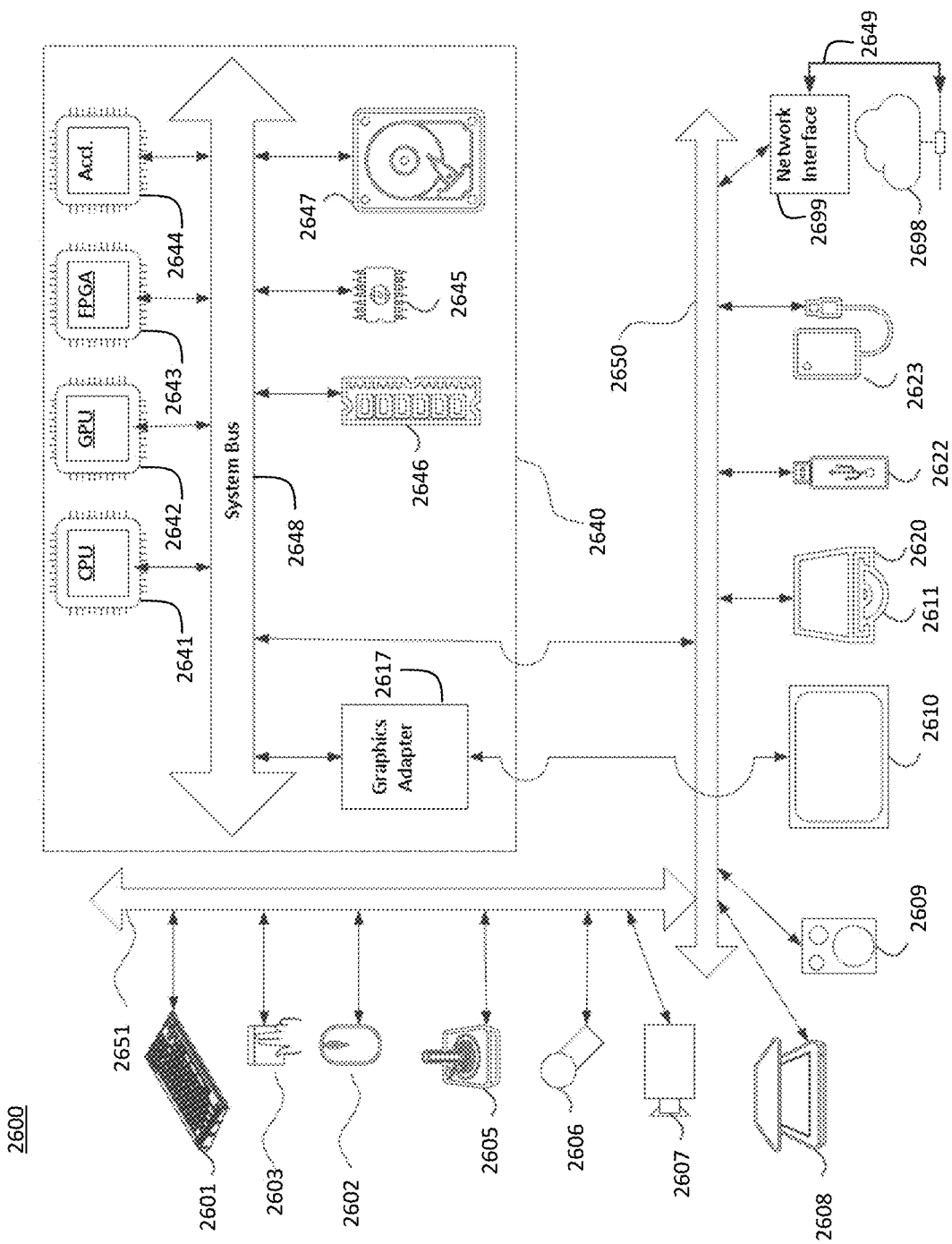
FIG. 26 is a simplified diagram in accordance with embodiments.

The components shown in FIG. 26 for computer system 2600 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 2600.

Computer system 2600 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 2601, mouse 2602, trackpad 2603, touch screen 2610, joystick 2605, microphone 2606, scanner 2608, camera 2607.

Computer system 2600 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 2610, or joystick 2605, but there can also be tactile feedback devices that do not serve as input devices), audio output devices (such as: speakers 2609, headphones (not depicted)), visual output devices (such as screens 2610 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 2600 can also include human accessible storage devices and their associated media such as optical media including CD/DVD ROM/RW 2620 with CD/DVD 2611 or the like media, thumb-drive 2622, removable hard drive or solid state drive 2623, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 2600 can also include interface 2699 to one or more communication networks 2698. Networks 2698 can for example be wireless, wireline, optical. Networks 2698 can further be local, wide-area, metropolitan, vehicular and industrial, real-time, delay-tolerant, and so on. Examples of networks 2698 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 2698 commonly require external network interface adapters that attached to certain general-purpose data ports or peripheral buses (2650 and 2651) (such as, for example USB ports of the computer system 2600; others are commonly integrated into the core of the computer system 2600 by attachment to a system bus as described below (for example Ethernet interface into a PC computer system or cellular network interface into a smartphone computer system). Using any of these networks 2698, computer system 2600 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 2640 of the computer system 2600.

The core 2640 can include one or more Central Processing Units (CPU) 2641, Graphics Processing Units (GPU) 2642, a graphics adapter 2617, specialized programmable processing units in the form of Field Programmable Gate Areas (FPGA) 2643, hardware accelerators for certain tasks 2644, and so forth. These devices, along with Read-only memory (ROM) 2645, Random-access memory 2646, internal mass storage such as internal non-user accessible hard drives, SSDs, and the like 2647, may be connected through a system bus 2648. In some computer systems, the system bus 2648 can be accessible in the form of one or more physical plugs to enable extensions by additional CPUs, GPU, and the like. The peripheral devices can be attached either directly to the core's system bus 2648, or through a peripheral bus 2649. Architectures for a peripheral bus include PCI, USB, and the like.

CPUs 2641, GPUs 2642, FPGAs 2643, and accelerators 2644 can execute certain instructions that, in combination, can make up the aforementioned computer code. That computer code can be stored in ROM 2645 or RAM 2646. Transitional data can be also be stored in RAM 2646, whereas permanent data can be stored for example, in the internal mass storage 2647. Fast storage and retrieval to any of the memory devices can be enabled through the use of cache memory, that can be closely associated with one or more CPU 2641, GPU 2642, mass storage 2647, ROM 2645, RAM 2646, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 2600, and specifically the core 2640 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 2640 that are of non-transitory nature, such as core-internal mass storage 2647 or ROM 2645. The software implementing various embodiments of the present disclosure can be stored in such devices and executed by core 2640. A computer-readable medium can include one or more memory devices or chips, according to particular needs. The software can cause the core 2640 and specifically the processors therein (including CPU, GPU, FPGA, and the like) to execute particular processes or particular parts of particular processes described herein, including defining data structures stored in RAM 2646 and modifying such data structures according to the processes defined by the software. In addition or as an alternative, the computer system can provide functionality as a result of logic hardwired or otherwise embodied in a circuit (for example: accelerator 2644), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video coding, the method comprising:
obtaining volumetric data of at least one three-dimensional (3D) visual content;
obtaining a plurality of 3D meshes from the volumetric data;
projecting vertices of the plurality of 3D meshes onto a plurality of two-dimensional (2D) meshes; and
signaling connectivity information of the plurality of 3D meshes based on the plurality of 2D meshes,
the signaling the connectivity information comprises signaling whether one of pixels of a 2D occupancy map is to be inferred or explicitly signaled and whether:
a first pixel of the pixels of the 2D occupancy map is to be inferred, and
a second pixel of the pixels of the 2D occupancy map is to be explicitly signaled.

2. The method for video coding according to claim 1, wherein the signaling the connectivity information further comprises:
setting a group of at least three pixels neighboring each other among other ones of the pixels of the 2D occupancy map,
determining whether each of the at least three pixels is occupied or unoccupied according to the vertices of the plurality of 3D meshes projected onto the 2D meshes, and
signaling, in response to determining that each of the at least three pixels is occupied, a first triangle mesh comprising the at least three pixels as vertices of the first triangle mesh.

3. The method for video coding according to claim 2, wherein the signaling, in response to determining that each of the at least three pixels is occupied, the first triangle mesh comprises signaling that each of the at least three pixels is to be inferred.

4. The method for video coding according to claim 2, wherein
the group comprises four pixels, including the at least three pixels, neighboring each other among other ones of the pixels of the 2D occupancy map, and
determining whether each of the at least three pixels is occupied or unoccupied comprises determining whether any of the four pixels is occupied or unoccupied according to the vertices of the plurality of 3D meshes projected onto the 2D meshes.

5. The method for video coding according to claim 4, wherein
signaling the connectivity information further comprises signaling, in response to determining that each of the four pixels is occupied, a quad mesh comprising the first triangle mesh and a second triangle mesh comprising vertices of a fourth pixel of the four pixels and at least two of the at least three pixels.

6. The method for video coding according to claim 5, wherein the signaling, in response to determining that each of the four pixels is occupied, the quad mesh comprises signaling that each of the four pixels is to be inferred.

7. The method for video coding according to claim 1, wherein the signaling the connectivity information further comprises signaling whether the 2D occupancy map comprises polygonal meshes of the pixels to be inferred.

8. The method for video coding according to claim 7, wherein the polygonal meshes comprise a combination of triangle meshes and quad meshes.

9. The method for video coding according to claim 7, wherein the signaling the connectivity information further comprises signaling, in at least one of a sequence header and a slice header, whether the 2D occupancy map comprises the polygonal meshes of the pixels to be inferred.

10. An apparatus for video coding, the apparatus comprising:
at least one memory configured to store computer program code;
at least one processor configured to access the computer program code and operate as instructed by the computer program code, the computer program code including:
obtaining code configured to cause the at least one processor to obtain volumetric data of at least one three-dimensional (3D) visual content;
further obtaining code configured to cause the at least one processor to obtain a plurality of 3D meshes from the volumetric data;
projecting code configured to cause the at least one processor to project vertices of the plurality of 3D meshes onto a plurality of two-dimensional (2D) meshes; and
signaling code configured to cause the at least one processor to signal connectivity information of the plurality of 3D meshes based on the plurality of 2D meshes;
signaling the connectivity information comprises signaling whether ones of pixels of a 2D occupancy map is to be inferred or explicitly signaled and whether:
a first pixel of the pixels of the 2D occupancy map is to be inferred, and
a second pixel of the pixels of the 2D occupancy map is to be explicitly signaled.

11. The apparatus for video coding according to claim 10, wherein the signaling the connectivity information further comprises:
setting a group of at least three pixels neighboring each other among other ones of the pixels of the 2D occupancy map,
determining whether each of the at least three pixels is occupied or unoccupied according to the vertices of the plurality of 3D meshes projected onto the 2D meshes, and
signaling, in response to determining that each of the at least three pixels is occupied, a first triangle mesh comprising the at least three pixels as vertices of the first triangle mesh.

12. The apparatus for video coding according to claim 11, wherein the signaling, in response to determining that each of the at least three pixels is occupied, the first triangle mesh comprises signaling that each of the at least three pixels is to be inferred.

13. The apparatus for video coding according to claim 11, wherein
the group comprises four pixels, including the at least three pixels, neighboring each other among other ones of the pixels of the 2D occupancy map, and
determining whether each of the at least three pixels is occupied or unoccupied comprises determining whether any of the four pixels is occupied or unoccupied according to the vertices of the plurality of 3D meshes projected onto the 2D meshes.

14. The apparatus for video coding according to claim 13, wherein
signaling the connectivity information further comprises signaling, in response to determining that each of the four pixels is occupied, a quad mesh comprising the first triangle mesh and a second triangle mesh comprising vertices of a fourth pixel of the four pixels and at least two of the at least three pixels.

15. The apparatus for video coding according to claim 14, wherein the signaling, in response to determining that each of the four pixels is occupied, the quad mesh comprises signaling that each of the four pixels is to be inferred.

16. The apparatus for video coding according to claim 10, wherein the signaling the connectivity information further comprises signaling whether the 2D occupancy map comprises polygonal meshes of the pixels to be inferred.

17. The apparatus for video coding according to claim 16, wherein the polygonal meshes comprise a combination of triangle meshes and quad meshes.

18. A non-transitory computer readable medium storing a program causing a computer to execute a process, the process comprising:
    obtaining volumetric data of at least one three-dimensional (3D) visual contents;
    obtaining a plurality of 3D meshes from the volumetric data;
    projecting vertices of the plurality of 3D meshes onto a plurality of two-dimensional (2D) meshes;
    signaling connectivity information of the plurality of 3D meshes based on the plurality of 2D meshes;
    signaling the connectivity information comprises signaling whether ones of pixels of a 2D occupancy map is to be inferred or explicitly signaled and whether:
    a first pixel of the pixels of the 2D occupancy map is to be inferred, and
    a second pixel of the pixels of the 2D occupancy map is to be explicitly signaled.

* * * * *